US012766701B2

(12) United States Patent
Murphy et al.

(10) Patent No.: US 12,766,701 B2
(45) Date of Patent: Oct. 20, 2026

(54) INTEGRATED MOBILE MANIPULATOR ROBOT

(71) Applicant: Boston Dynamics, Inc., Waltham, MA (US)

(72) Inventors: Michael Murphy, Carlisle, MA (US); Benjamin Zelnick, Newton, MA (US); Malik Hansen, Sudbury, MA (US); Vadim Chernyak, Waltham, MA (US); Christopher Everett Thorne, Waltham, MA (US); Alex Perkins, Lincoln, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

(21) Appl. No.: 19/042,586

(22) Filed: Jan. 31, 2025

(65) Prior Publication Data

US 2025/0178188 A1 Jun. 5, 2025

Related U.S. Application Data

(63) Continuation of application No. 17/699,534, filed on Mar. 21, 2022, now Pat. No. 12,251,831.

(Continued)

(51) Int. Cl.
*B25J 9/06* (2006.01)
*B25J 9/16* (2006.01)

(Continued)

(52) U.S. Cl.
CPC ................. *B25J 9/06* (2013.01); *B25J 9/162* (2013.01); *B25J 9/1666* (2013.01); *B25J 9/1694* (2013.01);

(Continued)

(58) Field of Classification Search
CPC ........ B25J 9/162; B25J 15/0616; B25J 17/02; B25J 5/007; B25J 9/1694; B25J 17/0283
See application file for complete search history.

(56) References Cited

U.S. PATENT DOCUMENTS

| | | | | | |
|---|---|---|---|---|---|
| 5,344,202 | A | * | 9/1994 | Ramler | B65G 47/91 294/188 |
| 5,374,879 | A | * | 12/1994 | Pin | B25J 5/007 180/21 |

(Continued)

FOREIGN PATENT DOCUMENTS

| | | | |
|---|---|---|---|
| CA | 2959343 | A1 | 3/2016 |
| CN | 202045634 | U | 11/2011 |

(Continued)

OTHER PUBLICATIONS

Extended European Search Report mailed May 14, 2021 in connection with European Application No. 20214566.0.

(Continued)

*Primary Examiner* — Randell J Krug
(74) *Attorney, Agent, or Firm* — Pierce Atwood LLP

(57) ABSTRACT

A robot includes a mobile base, a turntable rotatably coupled to the mobile base, a robotic arm operatively coupled to the turntable, and at least one directional sensor. An orientation of the at least one directional sensor is independently controllable. A method of controlling a robotic arm includes controlling a state of a mobile base and controlling a state of a robotic arm coupled to the mobile base, based, at least in part, on the state of the mobile base.

17 Claims, 10 Drawing Sheets

Related U.S. Application Data

(60) Provisional application No. 63/166,780, filed on Mar. 26, 2021.

(51) Int. Cl.
*B25J 15/06* (2006.01)
*B25J 17/02* (2006.01)
*B25J 5/00* (2006.01)

(52) U.S. Cl.
CPC ....... *B25J 15/0616* (2013.01); *B25J 17/0283* (2013.01); *B25J 5/007* (2013.01)

(56) References Cited

U.S. PATENT DOCUMENTS

| | | | | |
|---|---|---|---|---|
| 5,632,590 | A * | 5/1997 | Pearson | B25J 15/0616 414/789.5 |
| 6,113,343 | A * | 9/2000 | Goldenberg | B25J 19/005 239/587.2 |
| 7,404,536 | B2 | 7/2008 | Kalb | |
| 8,322,249 | B2 * | 12/2012 | Seavey | B25J 5/005 74/490.04 |
| 8,414,043 | B2 * | 4/2013 | Albin | B25J 15/0213 294/106 |
| 9,205,558 | B1 | 12/2015 | Zevenbergen et al. | |
| 9,457,477 | B1 | 10/2016 | Rublee et al. | |
| 9,937,012 | B2 * | 4/2018 | Hares | A61B 34/30 |
| 10,000,188 | B2 * | 6/2018 | Bosscher | B60S 9/02 |
| 10,137,566 | B2 * | 11/2018 | Bastian, II | B25J 9/0018 |
| 10,335,947 | B1 | 7/2019 | Diankov et al. | |
| 11,407,103 | B2 * | 8/2022 | Saunders | B25J 15/0633 |
| 11,426,885 | B1 * | 8/2022 | Rembisz | B25J 19/005 |
| 11,436,869 | B1 * | 9/2022 | Kirmani | B25J 5/007 |
| 11,458,635 | B2 | 10/2022 | Wicks et al. | |
| 12,251,837 | B2 | 3/2025 | Saunders et al. | |
| 2003/0230694 | A1 | 12/2003 | Kalb | |
| 2008/0202602 | A1 | 8/2008 | Flaim et al. | |
| 2009/0071281 | A1 * | 3/2009 | Fisk | B25J 19/023 901/29 |
| 2010/0224427 | A1 * | 9/2010 | Nuchter | B60B 19/125 180/7.1 |
| 2013/0008138 | A1 * | 1/2013 | Subotincic | B25J 15/0616 294/81.1 |
| 2013/0017053 | A1 * | 1/2013 | Forget | B65G 59/005 414/801 |
| 2013/0231779 | A1 * | 9/2013 | Purkayastha | B25J 9/1697 700/258 |
| 2013/0310982 | A1 * | 11/2013 | Scheurer | B25J 5/007 700/263 |
| 2016/0325432 | A1 * | 11/2016 | Tian | B25J 19/023 |
| 2017/0066592 | A1 * | 3/2017 | Bastian, II | B25J 9/0018 |
| 2017/0197796 | A1 | 7/2017 | Dunkmann et al. | |
| 2017/0265392 | A1 | 9/2017 | Van De Vegte | |
| 2018/0104829 | A1 * | 4/2018 | Altman | B25J 19/005 |
| 2018/0207814 | A1 | 7/2018 | Lessing et al. | |
| 2019/0138009 | A1 * | 5/2019 | Saito | B25J 13/087 |
| 2019/0337163 | A1 | 11/2019 | Dunkmann et al. | |
| 2019/0344448 | A1 | 11/2019 | Wicks et al. | |
| 2020/0108496 | A1 | 4/2020 | Bidram et al. | |
| 2020/0242544 | A1 * | 7/2020 | Galluzzo | B25J 11/00 |
| 2020/0348324 | A1 * | 11/2020 | Wikholm | B01L 3/5085 |
| 2020/0376689 | A1 * | 12/2020 | Rembisz | B25J 13/089 |
| 2020/0398433 | A1 * | 12/2020 | Kelly | B25J 13/085 |
| 2021/0031361 | A1 | 2/2021 | Morey | |
| 2021/0032034 | A1 * | 2/2021 | Kalouche | B25J 5/007 |
| 2021/0170583 | A1 * | 6/2021 | Edsinger | B25J 13/08 |
| 2021/0178604 | A1 * | 6/2021 | Saunders | B25J 5/007 |
| 2021/0206003 | A1 * | 7/2021 | Zhou | B25J 13/006 |
| 2021/0260758 | A1 * | 8/2021 | Singh | B25J 13/088 |
| 2021/0379757 | A1 * | 12/2021 | Schneider | B25J 11/00 |
| 2022/0371292 | A1 * | 11/2022 | Petersen | B25J 15/0061 |
| 2025/0187179 | A1 | 6/2025 | Saunders et al. | |
| 2026/0001240 | A1 * | 1/2026 | Peng | B25J 15/0023 |

FOREIGN PATENT DOCUMENTS

| | | | | | |
|---|---|---|---|---|---|
| CN | 106882283 | A | * | 6/2017 | B62D 57/024 |
| CN | 107662196 | A | * | 2/2018 | B25J 5/007 |
| CN | 108908374 | A | | 11/2018 | |
| CN | 110329710 | A | | 10/2019 | |
| CN | 212146441 | U | | 12/2020 | |
| CN | 112157651 | A | * | 1/2021 | B25J 9/1651 |
| CN | 120112368 | A | * | 6/2025 | B25J 15/0683 |
| DE | 102008006982 | A1 | * | 8/2009 | G05B 19/4083 |
| DE | 102020006436 | A1 | * | 5/2021 | G01B 11/14 |
| EP | 3251996 | A1 | | 12/2017 | |
| EP | 3126271 | B1 | * | 5/2020 | B65G 67/08 |
| EP | 4624116 | A1 | * | 10/2025 | B25J 9/1612 |
| GB | 2590567 | A | * | 6/2021 | B25J 17/0258 |
| JP | H05069997 | A | | 3/1993 | |
| JP | 2000127071 | A | | 5/2000 | |
| JP | 2004322240 | A | | 11/2004 | |
| JP | 2005052919 | A | | 3/2005 | |
| JP | 2017520417 | A | | 7/2017 | |
| JP | 2018058175 | A | | 4/2018 | |
| JP | 2019048367 | A | | 3/2019 | |
| JP | 6611297 | B1 | | 11/2019 | |
| KR | 10-2017-0013925 | | | 2/2017 | |
| RU | 97080 | U1 | | 8/2010 | |
| SE | 1830158 | A1 | | 11/2019 | |
| WO | 2019215384 | A1 | | 11/2019 | |
| WO | WO-2020069604 | A1 | * | 4/2020 | B25J 5/007 |
| WO | WO-2020220118 | A1 | * | 11/2020 | A47B 11/14 |
| WO | WO-2021243515 | A1 | * | 12/2021 | B25J 91/002 |

OTHER PUBLICATIONS

Fuchs, M. et al., "Rollin'Justin—Design considerations and realization of a mobile platform for a humanoid upper body" 2009 IEEE International Conference on Robotics and Automation, pp. 4131-4137. IEEE, May 12, 2009.

* cited by examiner

INTEGRATED MOBILE MANIPULATOR ROBOT

CROSS-REFERENCE TO RELATED APPLICATIONS

This application is a continuation of U.S. patent application Ser. No. 17/699,534, filed Mar. 21, 2022 and titled "INTEGRATED MOBILE MANIPULATOR ROBOT," which claims the benefit of priority under 35 U.S.C. § 119 of U.S. Provisional Application Ser. No. 63/166,780, filed Mar. 26, 2021, titled, "AN INTEGRATED MOBILE MANIPULATOR ROBOT," each of which is incorporated by reference herein in its entirety.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction-based mechanisms), or some combination of a manipulator and a mobile robot. Robots are utilized in a variety of industries including, for example, manufacturing, warehouse logistics, transportation, hazardous environments, exploration, and healthcare.

SUMMARY

Some embodiments relate to a robot comprising a mobile base, a turntable rotatably coupled to the mobile base, a robotic arm operatively coupled to the turntable, and at least one directional sensor. An orientation of the at least one directional sensor is independently controllable.

In one aspect, the robot further comprises a perception mast operatively coupled to the turntable, the perception mast comprising a plurality of sensors including the at least one directional sensor. In another aspect, the perception mast is rotatably coupled to the turntable. In another aspect, the turntable is configured to rotate relative to the mobile base about a first axis, and the perception mast is configured to rotate relative to the turntable about a second axis, wherein the first and second axes are parallel. In another aspect, the robotic arm is kinematically constrained to avoid collisions with the perception mast.

In one aspect, the robot further comprises a vacuum-based end effector operatively coupled to a distal portion of the robotic arm. In another aspect, the robot further comprises an on-board vacuum source operatively coupled to the vacuum-based end effector. In another aspect, the on-board vacuum source is configured to rotate with the turntable when the turntable rotates relative to the mobile base. In another aspect, the on-board vacuum source is disposed within the end effector.

In one aspect, the robotic arm is a six degree of freedom robotic arm. In another aspect, the robotic arm comprises three pitch joints and a spherical three degree of freedom wrist. In another aspect, the robotic arm comprises a first joint comprising a first actuator configured to rotate a first link of the robotic arm relative to the turntable about a first axis, a second joint comprising a second actuator configured to rotate a second link of the robotic arm relative to the first link about a second axis, and a third joint comprising a third actuator configured to rotate a third link of the robotic arm relative to the second link about a third axis, wherein the first, second, and third axes are parallel. In another aspect, the robotic arm comprises a link, an end effector, and a spherical wrist coupling the link and the end effector. The spherical wrist comprises a first actuator configured to rotate the end effector relative to the link about a first axis, a second actuator configured to rotate the end effector relative to the link about a second axis, and a third actuator configured to rotate the end effector relative to the link about a third axis, wherein the first, second, and third axes are mutually perpendicular, and wherein the first, second, and third axes intersect. In another aspect, a first rotation axis of the first actuator is offset from the first axis, a second rotation axis of the second actuator is offset from the second axis, and a third rotation axis of the third actuator is offset from the third axis. In another aspect, the end effector is a vacuum-based end effector, and the vacuum tubing coupled to the vacuum-based end effector is routed through the spherical wrist. In another aspect, the vacuum tubing is routed through the intersection of the first, second, and third axes of the spherical wrist. In another aspect, the spherical wrist comprises one or more vacuum slip rings.

In one aspect, the mobile base comprises a holonomic drive system. In another aspect, the mobile base comprises a plurality of distance sensors. In another aspect, the plurality of distance sensors comprise a plurality of LiDAR sensors. In another aspect, the mobile base is rectangular, and each side of the mobile base is associated with at least one of the plurality of distance sensors. In another aspect, the mobile base is square.

Some embodiments relate to a mobile base for a robotic manipulator. The mobile base comprises a platform configured to be coupled to the robotic manipulator, a drive system comprising a plurality of wheels, and a suspension system. The suspension system is configured to control distances between the platform and each wheel of the plurality of wheels. A first distance between the platform and a first wheel of the plurality of wheels depends, at least in part, on a second distance between the platform and a second wheel of the plurality of wheels.

In one aspect, the suspension system comprises a passive suspension system. In another aspect, the suspension system comprises a first rocker operatively coupling first and second wheels of the plurality of wheels, the first rocker configured to rotate about a first axis, and a second rocker operatively coupling third and fourth wheels of the plurality of wheels, the second rocker configured to rotate about a second axis, wherein the second axis is parallel to the first axis. In another aspect, the suspension system further comprises a linkage operatively coupling a first portion of the first rocker and a first portion of the second rocker, the linkage comprising a link configured to rotate about a third axis. In another aspect, the third axis is perpendicular to the first axis. In another aspect, the linkage further comprises a first strut operatively coupling a first portion of the link and the first portion of the first rocker, and a second strut operatively coupling a second portion of the link and the first portion of the second rocker.

In one aspect, the plurality of wheels comprise a first wheel configured to form a first contact with a flat surface when the mobile base rests on the flat surface, a second wheel configured to form a second contact with the flat surface when the mobile base rests on the flat surface, a third wheel configured to form a third contact with the flat surface when the mobile base rests on the flat surface, and a fourth wheel configured to form a fourth contact with the flat surface when the mobile base rests on the flat surface, wherein the first, second, third, and fourth contacts define a quadrilateral. In another aspect, the suspension system is configured such that a primary support polygon is defined by first, second, third, and fourth vertices, wherein the first vertex is disposed on a first line connecting the first and second contacts, the second vertex is disposed on a second line connecting the second and third contacts, the third vertex is disposed on a third line connecting the third and fourth contacts, and the fourth vertex is disposed on a fourth line connecting the fourth and first contacts. In another aspect, the mobile base in combination with the robotic manipulator further comprises a controller configured to maintain a center of pressure of the mobile base, the robotic manipulator, and a payload within the primary support polygon when the robotic manipulator manipulates the payload. In another aspect, the controller is configured to maintain the center of pressure of the mobile base, the robotic manipulator, and a payload within a circular region inscribed within the primary support polygon. In another aspect, the suspension system is configured such that a secondary support polygon is defined by three of the four contact points. In another aspect, the mobile base in combination with the robotic manipulator, further comprises a controller, the suspension system is configured such that a secondary support polygon is defined by three of the four contact points, and the controller is configured to maintain a center of pressure of the mobile base, the robotic manipulator, and a payload within the secondary support polygon when the robotic manipulator manipulates the payload such that the center of pressure falls outside of the primary support polygon. In another aspect, each wheel of the plurality of wheels is kinematically coupled to each other wheel of the plurality of wheels. In another aspect, the suspension system further comprises a differential gear set coupling the first and second rockers.

Some embodiments relate to a mobile base for a robotic manipulator. The mobile base comprises a platform configured to be coupled to the robotic manipulator, a suspension system, and a drive system. The drive system comprises a plurality of wheels. When at least some of the plurality of wheels contact a surface, the drive system is configured to translate the mobile base in a first direction along a first axis relative to the surface, translate the mobile base in a second direction along a second axis relative to the surface, and rotate the mobile base about a third axis. The second axis is perpendicular to the first axis, and the third axis is perpendicular to both the first and second axes.

In one aspect, each wheel of the plurality of wheels is independently steerable. In another aspect, each wheel of the plurality of wheels is independently drivable. In another aspect, each wheel of the plurality of wheels is independently drivable. In another aspect, each wheel of the plurality of wheels is associated with two actuated degrees of freedom. In another aspect, the drive system is associated with three actuated degrees of freedom. In another aspect, the drive system comprises a first wheel of the plurality of wheels, wherein the first wheel is associated with a first drive actuator and a first steering actuator, a second wheel of the plurality of wheels, wherein the second wheel is associated with a second drive actuator and a second steering actuator, a third wheel of the plurality of wheels, wherein the third wheel is associated with a third drive actuator and a third steering actuator, and a fourth wheel of the plurality of wheels, wherein the fourth wheel is associated with a fourth drive actuator and a fourth steering actuator.

Some embodiments relate to a robot comprising a turntable, a robotic arm operatively coupled to the turntable, and a perception mast operatively coupled to the turntable. The perception mast comprises a plurality of sensors.

In one aspect, the perception mast is rotatably coupled to the turntable. In another aspect, the turntable is configured to rotate about a first axis, the perception mast is configured to rotate relative to the turntable about a second axis, and the first and second axes are parallel. In another aspect, the perception mast is disposed on the turntable at a maximum radial extent of the turntable relative to an axis of rotation of the turntable. In another aspect, the robotic arm is kinematically constrained to avoid collisions with the perception mast. In another aspect, the robotic arm comprises a wrist, a portion of the robotic arm proximal to the wrist is kinematically constrained to move within a vertical plane defined within a coordinate system of the turntable, and the perception mast does not intersect the vertical plane. In another aspect, the perception mast is rotatably coupled to the turntable. In another aspect, the robotic arm is a six degree of freedom robotic arm. In another aspect, the robotic arm comprises three pitch joints and a three degree of freedom wrist. In another aspect, the perception mast is rotatably coupled to the turntable, and wherein the perception mast is configured to rotate about a yaw axis. In another aspect, the turntable is operatively coupled to a mobile base.

Some embodiments relate to a method of controlling a robotic arm. The method comprises controlling a state of a mobile base and controlling a state of a robotic arm coupled to the mobile base, based, at least in part, on the state of the mobile base.

In one aspect, controlling the state of the robotic arm comprises controlling a state of a payload coupled to a distal portion of the robotic arm. In another aspect, controlling the state of the mobile base comprises performing one or more of translating the mobile base in a first direction, translating the mobile base in a second direction perpendicular to the first direction, and rotating the mobile base. In another aspect, controlling the state of the mobile base comprises actuating a holonomic drive system of the mobile base. In another aspect, the method further comprises computing safety constraints based, at least in part, on both the state of the mobile base and the state of the robotic arm. In another aspect, the method further comprises controlling a state of a perception mast coupled to the mobile base, based, at least in part, on the state of the mobile base and the state of the robotic arm. In another aspect, controlling the state of the perception mast comprises controlling a rotation of a turntable to which the perception mast is coupled, wherein the turntable is coupled to the mobile base. In another aspect, controlling the state of the perception mast comprises controlling a rotation of the perception mast relative to a turntable to which the perception mast is coupled, wherein the turntable is coupled to the mobile base. In another aspect, controlling the state of the robotic arm based, at least in part, on the state of the mobile base comprises controlling one or more joint angles and/or one or more joint velocities of the robotic arm based, at least in part, on a velocity of the mobile base.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
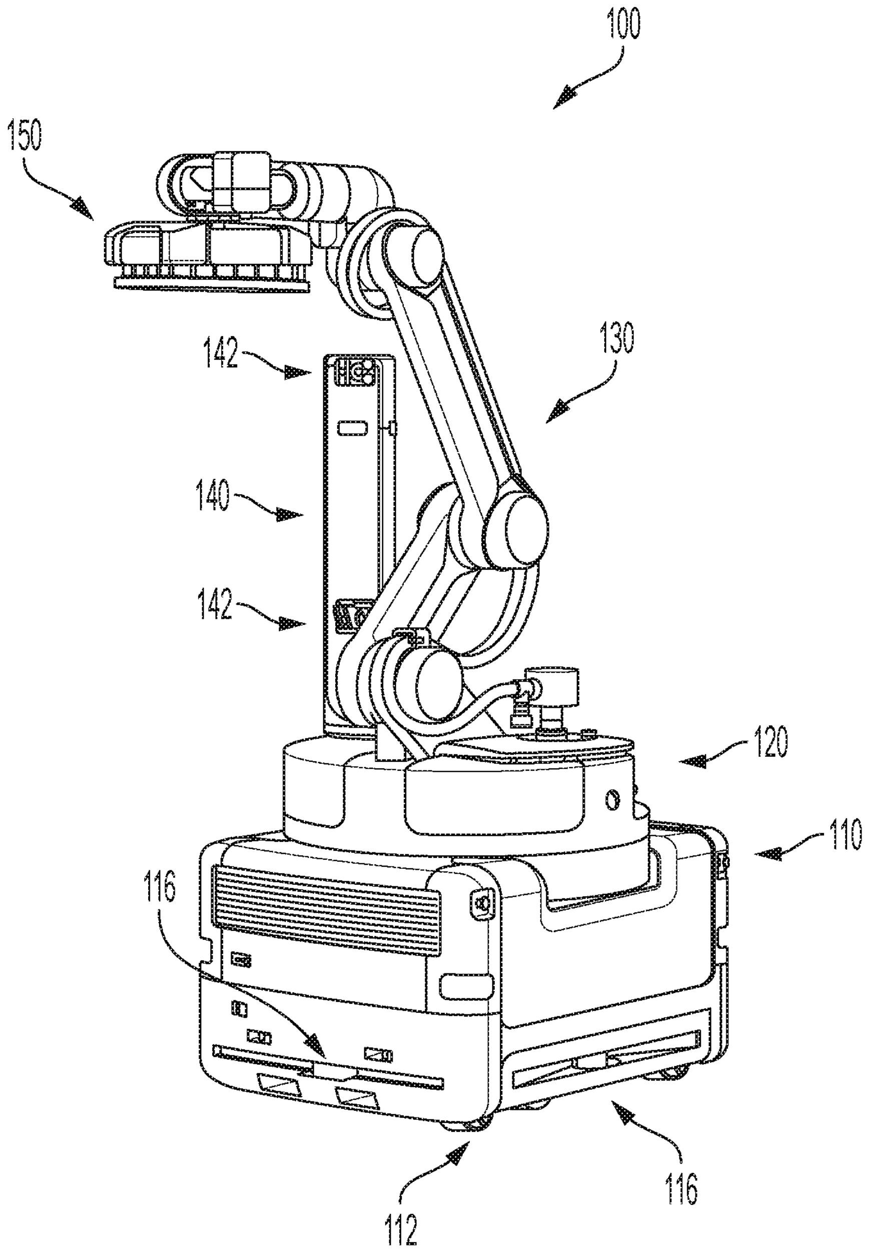
FIG. 1A is a perspective view of one embodiment of a robot.

Robots are typically configured to perform various tasks in an environment in which they are placed. Generally, these tasks include interacting with objects and/or the elements of the environment. Notably, robots are becoming popular in warehouse and logistics operations. Before the introduction of robots to such spaces, many operations were performed manually. For example, a person might manually unload boxes from a truck onto one end of a conveyor belt, and a second person at the opposite end of the conveyor belt might organize those boxes onto a pallet. The pallet may then be picked up by a forklift operated by a third person, who might drive to a storage area of the warehouse and drop the pallet for a fourth person to remove the individual boxes from the pallet and place them on shelves in the storage area. More recently, robotic solutions have been developed to automate many of these functions. Such robots may either be specialist robots (i.e., designed to perform a single task, or a small number of closely related tasks) or generalist robots (i.e., designed to perform a wide variety of tasks). To date, both specialist and generalist warehouse robots have been associated with significant limitations, as explained below.

A specialist robot may be designed to perform a single task, such as unloading boxes from a truck onto a conveyor belt. While such specialized robots may be efficient at performing their designated task, they may be unable to perform other, tangentially related tasks in any capacity. As such, either a person or a separate robot (e.g., another specialist robot designed for a different task) may be needed to perform the next task(s) in the sequence. As such, a warehouse may need to invest in multiple specialized robots to perform a sequence of tasks, or may need to rely on a hybrid operation in which there are frequent robot-to-human or human-to-robot handoffs of objects.

In contrast, a generalist robot may be designed to perform a wide variety of tasks, and may be able to take a box through a large portion of the box's life cycle from the truck to the shelf (e.g., unloading, palletizing, transporting, depalletizing, storing). While such generalist robots may perform a variety of tasks, they may be unable to perform individual tasks with high enough efficiency or accuracy to warrant introduction into a highly streamlined warehouse operation. For example, while mounting an off-the-shelf robotic manipulator onto an off-the-shelf mobile robot might yield a system that could, in theory, accomplish many warehouse tasks, such a loosely integrated system may be incapable of performing complex or dynamic motions that require coordination between the manipulator and the mobile base, resulting in a combined system that is inefficient and inflexible. Typical operation of such a system within a warehouse environment may include the mobile base and the manipulator operating sequentially and (partially or entirely) independently of each other. For example, the mobile base may first drive toward a stack of boxes with the manipulator powered down. Upon reaching the stack of boxes, the mobile base may come to a stop, and the manipulator may power up and begin manipulating the boxes as the base remains stationary. After the manipulation task is completed, the manipulator may again power down, and the mobile base may drive to another destination to perform the next task. As should be appreciated from the foregoing, the mobile base and the manipulator in such systems are effectively two separate robots that have been joined together; accordingly, a controller associated with the manipulator may not be configured to share information with, pass commands to, or receive commands from a separate controller associated with the mobile base. As such, such a poorly integrated mobile manipulator robot may be forced to operate both its manipulator and its base at suboptimal speeds or through suboptimal trajectories, as the two separate controllers struggle to work together. Additionally, while there are limitations that arise from a purely engineering perspective, there are additional limitations that must be imposed to comply with safety regulations. For instance, if a safety regulation requires that a mobile manipulator must be able to be completely shut down within a certain period of time when a human enters a region within a certain distance of the robot, a loosely integrated mobile manipulator robot may not be able to act sufficiently quickly to ensure that both the manipulator and the mobile base (individually and in aggregate) do not a pose a threat to the human. To ensure that such loosely integrated systems operate within required safety constraints, such systems are forced to operate at even slower speeds or to execute even more conservative trajectories than those limited speeds and trajectories as already imposed by the engineering problem. As such, the speed and efficiency of generalist robots performing tasks in warehouse environments to date have been limited.

In view of the above, the inventors have recognized and appreciated that a highly integrated mobile manipulator robot with system-level mechanical design and holistic control strategies between the manipulator and the mobile base may be associated with certain benefits in warehouse and/or logistics operations. Such an integrated mobile manipulator robot may be able to perform complex and/or dynamic motions that are unable to be achieved by conventional, loosely integrated mobile manipulator systems. As a result, this type of robot may be well suited to perform a variety of different tasks (e.g., within a warehouse environment) with speed, agility, and efficiency.

EXAMPLE ROBOT OVERVIEW

In this section, an overview of some components of one embodiment of a highly integrated mobile manipulator robot configured to perform a variety of tasks is provided to explain the interactions and interdependencies of various subsystems of the robot. Each of the various subsystems, as well as control strategies for operating the subsystems, are described in further detail in the following sections.

Figure 1B:
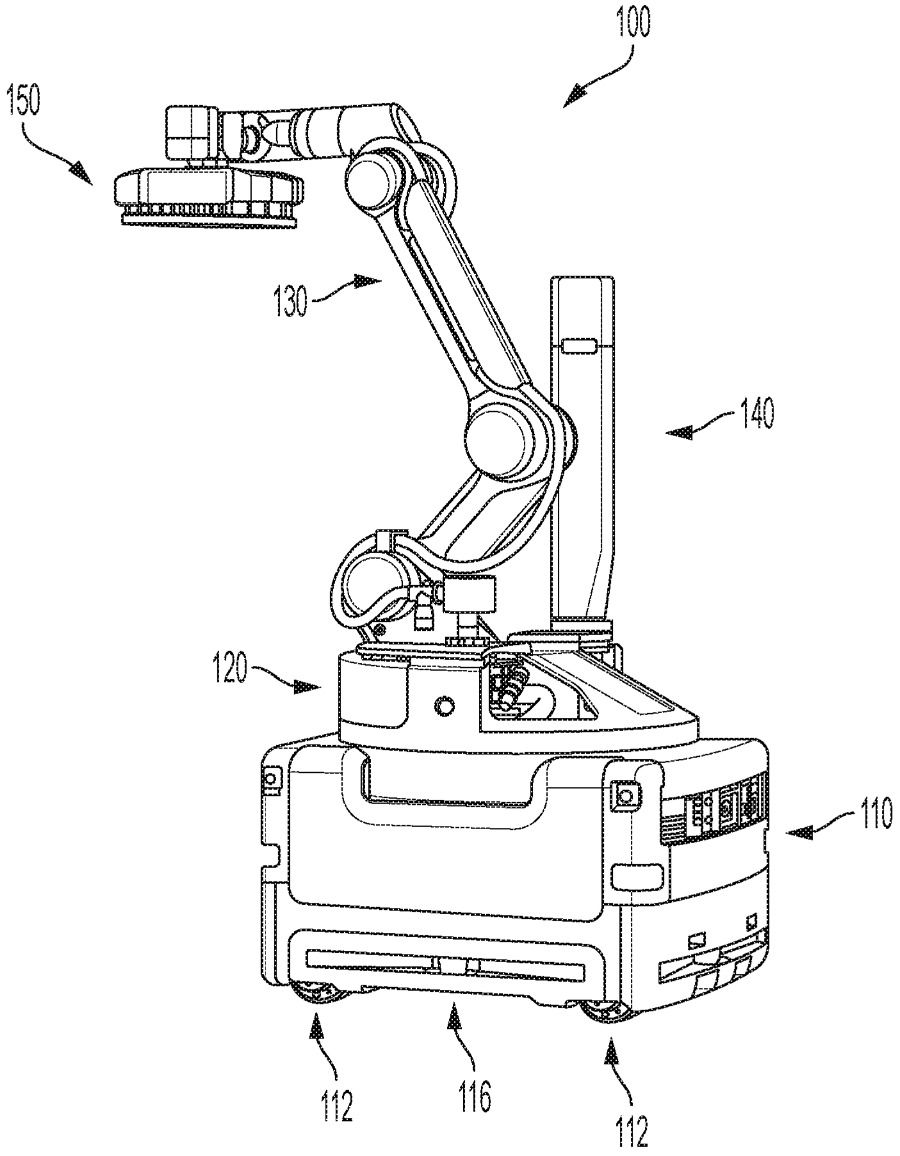
FIG. 1B is another perspective view of the robot of FIG. 1A.

FIGS. 1A and 1B are perspective views of one embodiment of a robot 100. The robot 100 includes a mobile base 110 and a robotic arm 130. The mobile base 110 includes an omnidirectional drive system that enables the mobile base to translate in any direction within a horizontal plane as well as rotate about a vertical axis perpendicular to the plane. Each wheel 112 of the mobile base 110 is independently steerable and independently drivable. The mobile base 110 additionally includes a number of distance sensors 116 that assist the robot 100 in safely moving about its environment. The robotic arm 130 is a 6 degree of freedom (6-DOF) robotic arm including three pitch joints and a 3-DOF wrist. An end effector 150 is disposed at the distal end of the robotic arm 130. The robotic arm 130 is operatively coupled to the mobile base 110 via a turntable 120, which is configured to rotate relative to the mobile base 110. In addition to the robotic arm 130, a perception mast 140 is also coupled to the turntable 120, such that rotation of the turntable 120 relative to the mobile base 110 rotates both the robotic arm 130 and the perception mast 140. The robotic arm 130 is kinematically constrained to avoid collision with the perception mast 140. The perception mast 140 is additionally configured to rotate relative to the turntable 120, and includes a number of perception modules 142 configured to gather information about one or more objects in the robot's environment. The integrated structure and system-level design of the robot 100 enable fast and efficient operation in a number of different applications, some of which are provided below as examples.

Figure 2A:
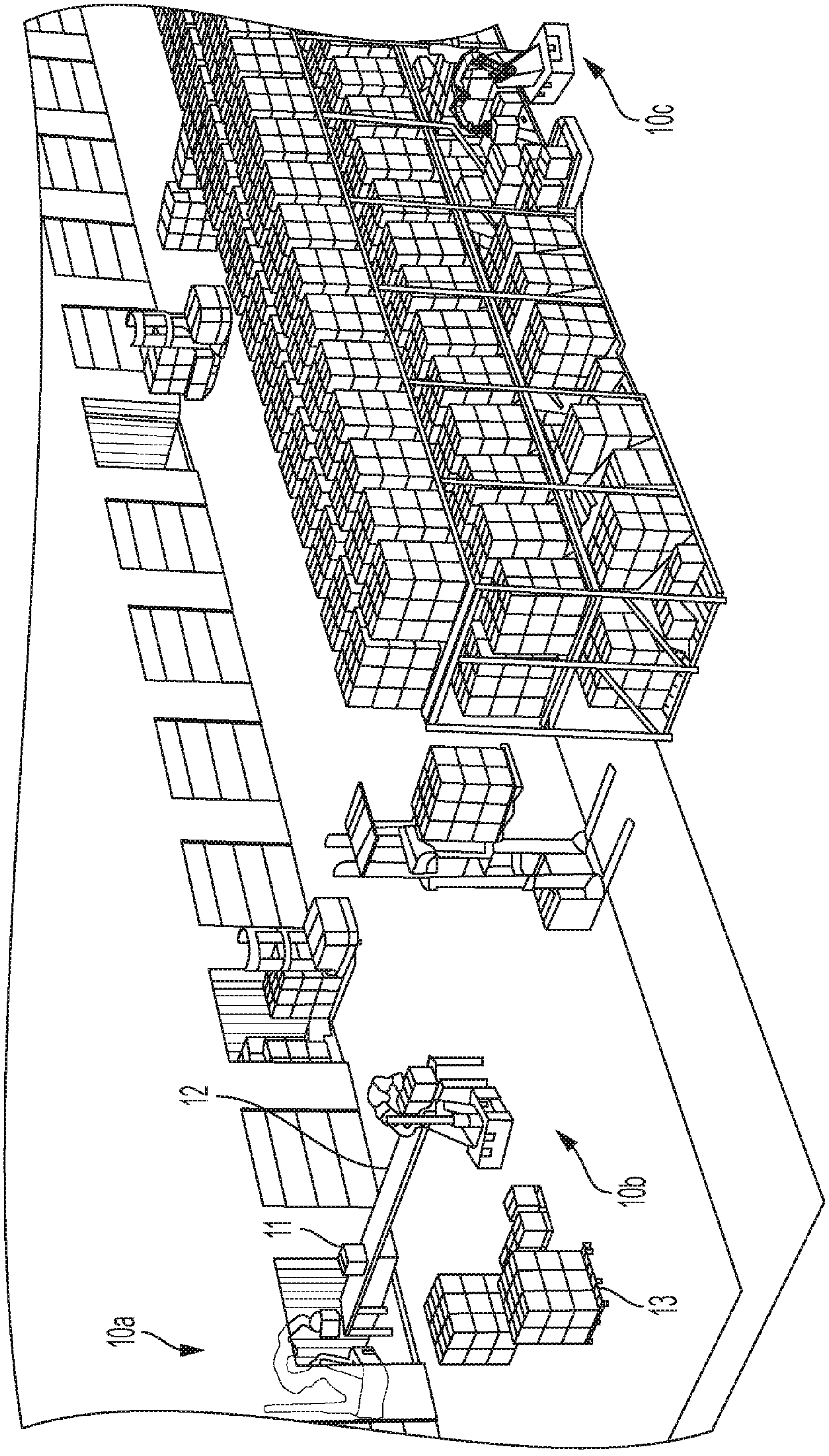
FIG. 2A depicts robots performing tasks in a warehouse environment.

FIG. 2A depicts robots 10*a*, 10*b*, and 10*c* performing different tasks within a warehouse environment. A first robot 10*a* is inside a truck (or a container), moving boxes 11 from a stack within the truck onto a conveyor belt 12 (this particular task will be discussed in greater detail below in reference to FIG. 2B). At the opposite end of the conveyor belt 12, a second robot 10*b* organizes the boxes 11 onto a pallet 13. In a separate area of the warehouse, a third robot 10*c* picks boxes from shelving to build an order on a pallet (this particular task will be discussed in greater detail below in reference to FIG. 2C). It should be appreciated that the robots 10*a*, 10*b*, and 10*c* are different instances of the same robot (or of highly similar robots). Accordingly, the robots described herein may be understood as specialized multi-purpose robots, in that they are designed to perform specific tasks accurately and efficiently, but are not limited to only one or a small number of specific tasks.

Figure 2B:
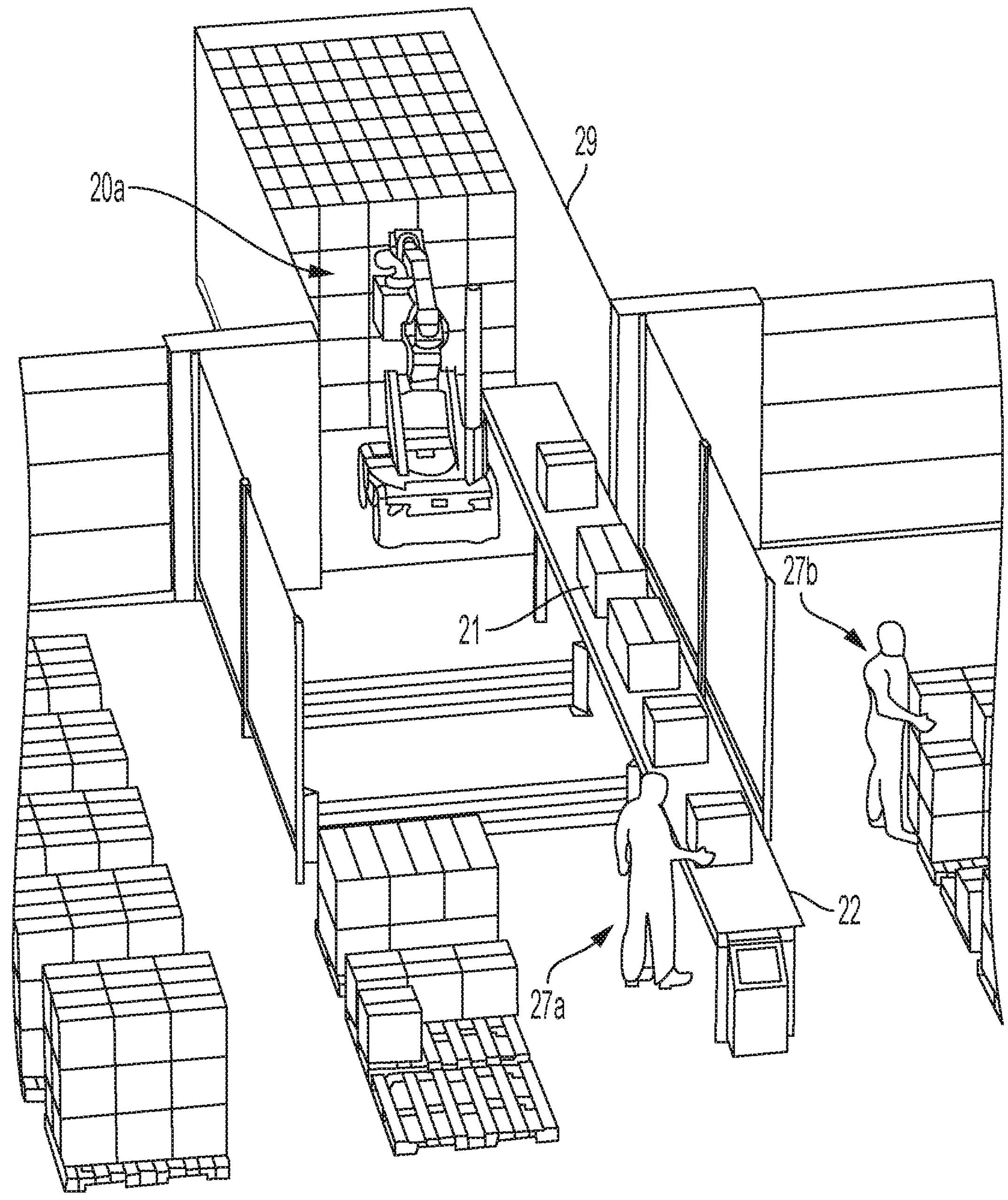
FIG. 2B depicts a robot unloading boxes from a truck.

FIG. 2B depicts a robot 20*a* unloading boxes 21 from a truck 29 and placing them on a conveyor belt 22. In this box picking application (as well as in other box picking applications), the robot 20*a* will repetitiously pick a box, rotate, place the box, and rotate back to pick the next box. Although robot 20*a* of FIG. 2B is a different embodiment from robot 100 of FIGS. 1A and 1B, referring to the components of robot 100 identified in FIGS. 1A and 1B will case explanation of the operation of the robot 20*a* in FIG. 2B. During operation, the perception mast of robot 20*a* (analogous to the perception mast 140 of robot 100 of FIGS. 1A and 1B) may be configured to rotate independent of rotation of the turntable (analogous to the turntable 120) on which it is mounted to enable the perception modules (akin to perception modules 142) mounted on the perception mast to capture images of the environment that enable the robot 20*a* to plan its next movement while simultaneously executing a current movement. For example, while the robot 20*a* is picking a first box from the stack of boxes in the truck 29, the perception modules on the perception mast may point at and gather information about the location where the first box is to be placed (e.g., the conveyor belt 22). Then, after the turntable rotates and while the robot 20*a* is placing the first box on the conveyor belt, the perception mast may rotate (relative to the turntable) such that the perception modules on the perception mast point at the stack of boxes and gather information about the stack of boxes, which is used to determine the second box to be picked. As the turntable rotates back to allow the robot to pick the second box, the perception mast may gather updated information about the area surrounding the conveyor belt. In this way, the robot 20*a* may parallelize tasks which may otherwise have been performed sequentially, thus enabling faster and more efficient operation.

Also of note in FIG. 2B is that the robot 20*a* is working alongside humans (e.g., workers 27*a* and 27*b*). Given that the robot 20*a* is configured to perform many tasks that have traditionally been performed by humans, the robot 20*a* is designed to have a small footprint, both to enable access to areas designed to be accessed by humans, and to minimize the size of a safety zone around the robot into which humans are prevented from entering.

Figure 2C:
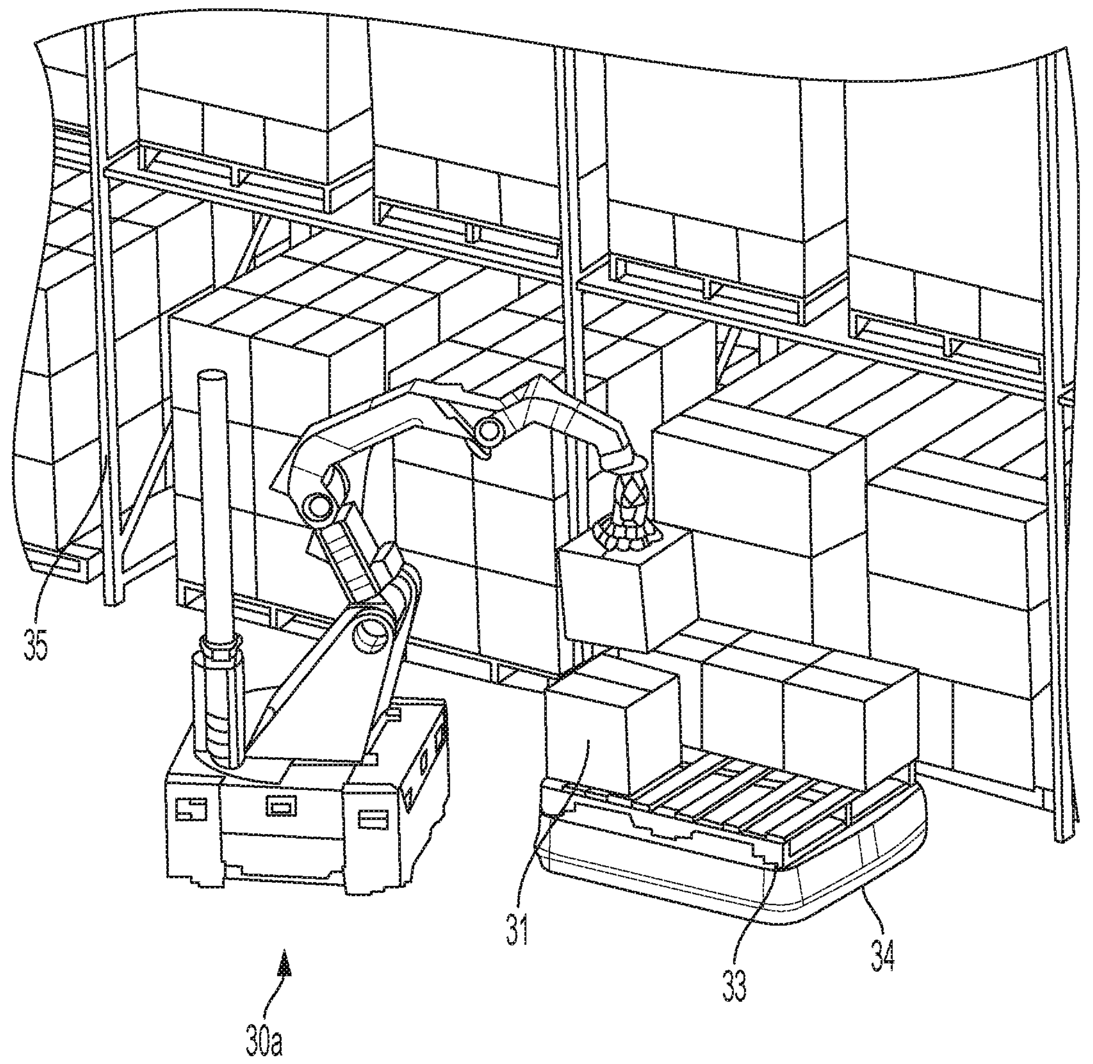
FIG. 2C depicts a robot building a pallet in a warehouse aisle.

FIG. 2C depicts a robot 30*a* performing an order building task, in which the robot 30*a* places boxes 31 onto a pallet 33. In FIG. 2C, the pallet 33 is disposed on top of an autonomous mobile robot (AMR) 34, but it should be appreciated that the capabilities of the robot 30*a* described in this example apply to building pallets not associated with an AMR. In this task, the robot 30*a* picks boxes 31 disposed above, below, or within shelving 35 of the warehouse and places the boxes on the pallet 33. Certain box positions and orientations relative to the shelving may suggest different box picking strategies. For example, a box located on a low shelf may simply be picked by the robot by grasping a top surface of the box with the end effector of the robotic arm (thereby executing a "top pick"). However, if the box to be picked is on top of a stack of boxes, and there is limited clearance between the top of the box and the bottom of a horizontal divider of the shelving, the robot may opt to pick the box by grasping a side surface (thereby executing a "face pick").

To pick some boxes within a constrained environment, the robot may need to carefully adjust the orientation of its arm to avoid contacting other boxes or the surrounding shelving. For example, in a typical "keyhole problem", the robot may only be able to access a target box by navigating its arm through a small space or confined area (akin to a keyhole) defined by other boxes or the surrounding shelving. In such scenarios, coordination between the mobile base and the arm of the robot may be beneficial. For instance, being able to translate the base in any direction allows the robot to position itself as close as possible to the shelving, effectively extending the length of its arm (compared to conventional robots without omnidirectional drive which may be unable to navigate arbitrarily close to the shelving). Additionally, being able to translate the base backwards allows the robot to withdraw its arm from the shelving after picking the box without having to adjust joint angles (or minimizing the degree to which joint angles are adjusted), thereby enabling a simple solution to many keyhole problems.

Of course, it should be appreciated that the tasks depicted in FIGS. 2A-2C are but a few examples of applications in which an integrated mobile manipulator robot may be used, and the present disclosure is not limited to robots configured to perform only these specific tasks. For example, the robots described herein may be suited to perform tasks including, but not limited to, removing objects from a truck or container, placing objects on a conveyor belt, removing objects from a conveyor belt, organizing objects into a stack, organizing objects on a pallet, placing objects on a shelf, organizing objects on a shelf, removing objects from a shelf, picking objects from the top (e.g., performing a "top pick"), picking objects from a side (e.g., performing a "face pick"), coordinating with other mobile manipulator robots, coordinating with other warehouse robots (e.g., coordinating with AMRs), coordinating with humans, and many other tasks.

EXAMPLE MOBILE BASE

As described above, a highly integrated mobile manipulator robot includes a mobile base and a robotic arm. The mobile base is configured to move the robot to different locations to enable interactions between the robotic arm and different objects of interest. In some embodiments, the mobile base may include an omnidirectional drive system that allows the robot to translate in any direction within a plane. The mobile base may additionally allow the robot to rotate about a vertical axis (e.g., to yaw). In some embodiments, the mobile base may include a holonomic drive system, while in some embodiments the drive system may be approximated as holonomic. For example, a drive system that may translate in any direction but may not translate in any direction instantaneously (e.g., if time is needed to reorient one or more drive components) may be approximated as holonomic.

In some embodiments, a mobile base may include sensors to help the mobile base navigate its environment. In the embodiment shown in FIGS. 1A and 1B, the mobile base 110 of the robot 100 includes distance sensors 116. The mobile base includes at least one distance sensor 116 on each side of the mobile base 110. A distance sensor may include a camera, a time of flight sensor, a LiDAR sensor, or any other sensor configured to sense information about the environment from a distance. In embodiments of a mobile base that include distance sensors with an associated field of view (e.g., cameras, LiDAR sensors), the fields of view of the distance sensors may overlap to provide a full 360-degree view of the environment around the robot. For example, a mobile base may be rectangular, and each of the four sides may be associated with a distance sensor. The locations of the distance sensors and the associated fields of view may be arranged such that the field of view of each distance sensor at least partially overlaps the fields of view of the two neighboring distance sensors.

Figure 3A:
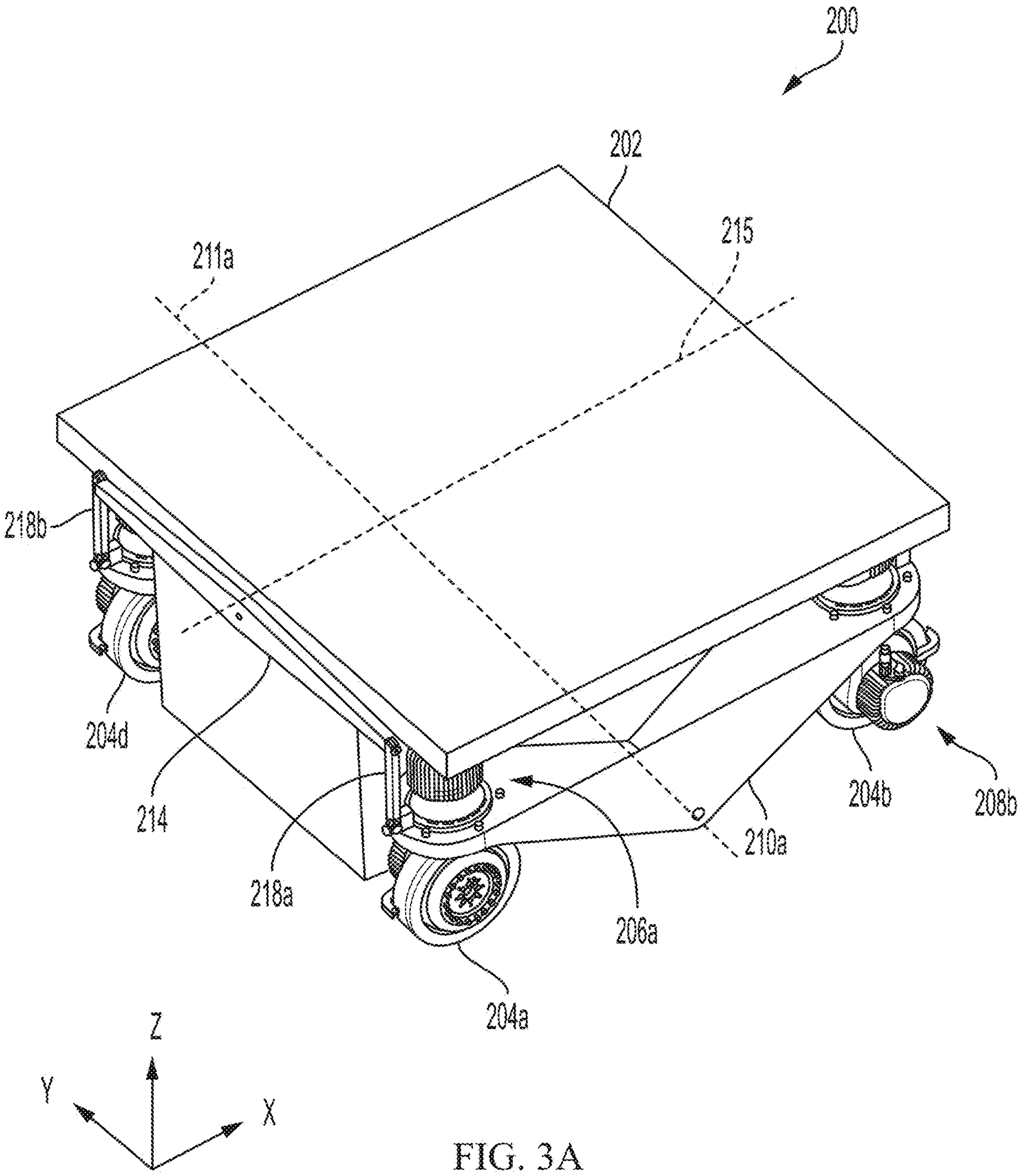
FIG. 3A is a perspective view of one embodiment of a mobile base of a robot.
Figure 3B:
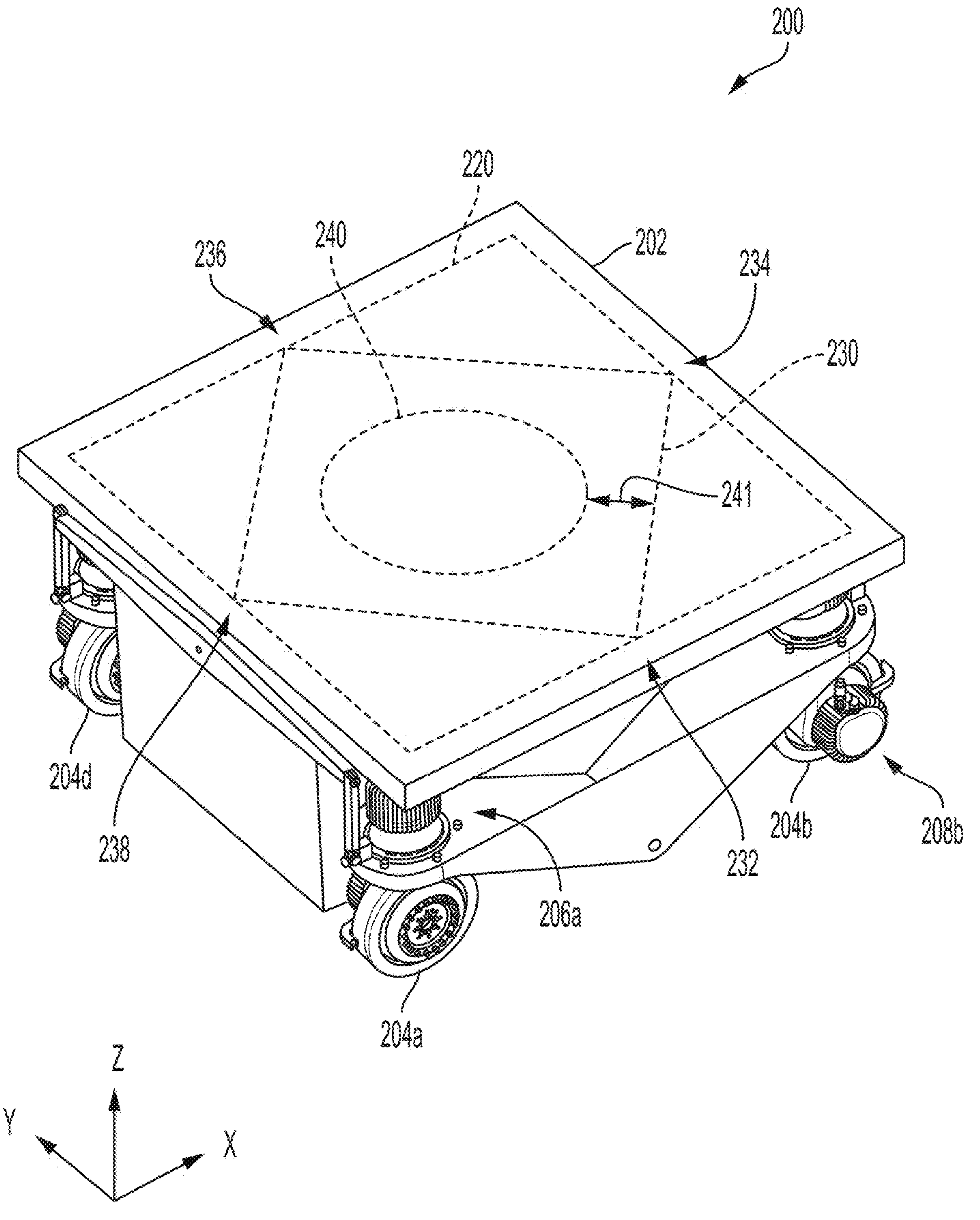
FIG. 3B is another perspective view of the mobile base of FIG. 3A.

FIGS. 3A and 3B are perspective views of one embodiment of a mobile base 200 of a robot (e.g., which may be used to implement mobile base 110 of robot 100 described in connection with FIGS. 1A and 1B). The mobile base 200 includes a drive system configured to adjust a position and/or orientation of the mobile base 200 relative to its environment. As shown, the drive system includes four wheels 204*a*-204*d*, each of which is independently steerable and independently drivable (as described in greater detail below). It should be appreciated, however, that some embodiments may include more than or fewer than four wheels. The drive system is configured to translate the mobile base 200 in two perpendicular directions as well as rotate the mobile base about an axis perpendicular to the directions of translation. In terms of the coordinate system of FIGS. 3A and 3B, the mobile base 200 is able to translate along perpendicular X and Y axes (wherein the X and Y axes define a plane, which may be a horizontal plane), and yaw about a Z axis (wherein the Z axis is perpendicular to the plane defined by the X and Y axes, wherein the Z axis may be a vertical axis that may be aligned with the direction of gravity). Accordingly, the drive system of the mobile base 200 is associated with at least three actuated degrees of freedom (i.e., translation in X, translation in Y, and rotation about Z).

In some embodiments, each wheel of a mobile base may be independently steerable. A mobile base with independently steerable wheels may be desirable in that such an arrangement may be associated with an omnidirectional and/or holonomic mobile base. Each steerable wheel may be associated with a dedicated steering actuator. In the embodiment of FIGS. 3A and 3B, each steerable wheel 204 is associated with a steering actuator 206. Specifically, a first steering actuator 206*a* is configured to steer the first wheel 204*a*, a second steering actuator 206*b* is configured to steer the second wheel 204*b*, a third steering actuator 206*c* is configured to steer the third wheel 204*c*, and a fourth steering actuator 206*d* is configured to steer the fourth wheel 204*d*. The steering actuators 206 are configured to adjust an angular position or angular speed of their respective wheels 204 about a vertical axis (e.g., about an axis parallel to the Z axis in the figure). Stated differently, the steering actuators 206 are configured to yaw their respective wheels 204. A steering actuator may include a motor, such as a brushed DC motor, a brushless DC motor, or a stepper motor. However, other types of actuators are contemplated, and the disclosure is not limited in this regard.

In some embodiments, one or more wheels of a mobile base may not be independently steerable. A wheel may be entirely passive (e.g., a castor), or steering of one wheel may be coupled to the steering of one or more other wheels (e.g., through a linkage mechanism). It should be appreciated that the present disclosure is not limited to embodiments of highly integrated mobile manipulators in which each wheel of the mobile base is independently steerable.

In some embodiments, each wheel of a mobile base may be independently drivable. A mobile base with independently drivable wheels may be desirable in that such an arrangement may be associated with increased traction, improved acceleration and/or deceleration, improved stiffness between the mobile base and the ground, and little to no frictional losses through passive wheels (e.g., castors). Each drivable wheel may be associated with a dedicated driving actuator. In the embodiment of FIGS. 3A and 3B, each drivable wheel 204 is associated with a driving actuator 208. Specifically, a first driving actuator 208*a* is configured to drive the first wheel 204*a*, a second driving actuator 208*b* is configured to drive the second wheel 204*b*, a third driving actuator 208*c* is configured to drive the third wheel 204*c*, and a fourth driving actuator 208*d* is configured to drive the fourth wheel 204*d*. The driving actuators 208 are configured to adjust an angular position or angular speed of their respective wheels 204 about a horizontal axis (e.g., an axis associated with the axle of the wheel). A driving actuator may include a motor, such as a brushed DC motor, a brushless DC motor, or a stepper motor. However, other types of actuators are contemplated, and the disclosure is not limited in this regard.

In some embodiments, one or more wheels of a mobile base may not be independently drivable. A wheel may be entirely passive (e.g., a castor), or the driving of one wheel may be coupled to the driving of one or more other wheels (e.g., through a transmission or drivetrain). It should be appreciated that the present disclosure is not limited to embodiments of highly integrated mobile manipulators in which each wheel of the mobile base is independently drivable.

In some embodiments, each wheel of a mobile base is independently steerable and independently drivable. In such embodiments, each wheel is associated with at least two actuated degrees of freedom (e.g., rotation about a drive axis, and rotation about a steering axis). In the embodiment of FIGS. 3A and 3B, each wheel 204 is associated with both a steering actuator 206 and a driving actuator 208, as described in the preceding paragraphs. As such, the mobile base 200 of FIGS. 3A and 3B includes four wheels 204*a*-204*d* and eight associated actuators (i.e., steering actuators 206*a*-206*d* and driving actuators 208*a*-208*d*). In embodiments of a mobile base with different numbers of wheels, a mobile base with independently steerable and independently drivable wheels may be associated with twice as many actuators as the number of wheels.

In addition to housing a drive system, a mobile base of a mobile manipulator robot may also house a suspension system. A suspension system may enhance the stability of the robot as the mobile base moves the robot up or down a ramp (e.g., going into or out of a truck), as the mobile base avoids or goes over an obstacle (e.g., a piece of scrap material on a warehouse floor), or as the robotic arm performs dynamic motions that adjust a center of pressure of the robot.

Still referring to FIGS. 3A and 3B, these views highlight one embodiment of a suspension system of the mobile base 200. Referring particularly to FIG. 3A, the mobile base 200 includes a platform 202 configured to be coupled to a robotic manipulator (e.g., via a turntable), four wheels 204*a*-204*d*, and a suspension system coupling the wheels to the platform.

The suspension system may be designed to support and stabilize a load on the platform (e.g., a turntable, a perception mast, and/or a robotic arm) as the mobile base moves in its environment. A load may include any mass associated with the mobile manipulator robot, including but not limited to a turntable, a perception mast, a robotic arm, and/or an object grasped by an end effector of the robotic arm. A load may additionally include any force and/or torque exerted on the suspension system. In addition to the force of gravity acting on the example masses above, loads may include inertial loads associated with the robot or objects in contact with the object. For example, a suspension system may accommodate loads associated with inertial forces from a robotic arm dynamically moving a heavy payload through a trajectory.

In the embodiment of FIGS. 3A and 3B, the suspension system is configured to control the distances between the platform 202 and each of the four wheels 204*a*-204*d*. Notably, each wheel is kinematically coupled to each of the other wheels by the suspension system, such that changing a relative distance between the platform and one wheel changes a relative distance between the platform and at least one other wheel.

Still referring to FIG. 3A, the suspension system includes a first rocker 210*a* coupling the first and second wheels 204*a* and 204*b*, and a second rocker 210*b* (not shown in the figure) coupling the third and fourth wheels 204*c* (not shown in the figure) and 204*d*. The first rocker 210*a* is configured to rotate about a first axis 211*a*, and the second rocker 210*b* is configured to rotate about a second axis 211*b* (not labeled in the figure) oriented parallel to the first axis 211*a*. In some embodiments, the first and second axes 211*a* and 211*b* are colinear. A linkage connects a first portion of the first rocker 210*a* (e.g., a portion of the first rocker 210*a* proximal the first wheel 204*a*) and a first portion of the second rocker 210*b* (e.g., a portion of the second rocker 210*b* proximal the fourth wheel 204*d*). The linkage includes a link 214 configured to rotate about a third axis 215. The third axis 215 may be perpendicular to the first axis 211*a* (and, by extension, to the second axis 211*b*). In the embodiment shown in FIG. 3A, the third axis 215 generally lies within a horizontal plane (e.g., a plane parallel to the XY plane, or a plane parallel to a top surface of the platform 202). However, in alternative embodiments, an axis of rotation of the link 214 may be a vertical axis (e.g., an axis parallel to the Z axis). In other embodiments, the link 214 may rotate about a different axis, as the disclosure is not limited in this regard. Regardless of the axis of rotation of the link 214, the linkage additionally includes first and second struts 218*a* and 218*b*. The first strut 218*a* couples a first portion of the link 214 and the first portion of the first rocker 210*a*, and the second strut 218*b* couples a second portion of the link 214 and the first portion of the second rocker 210*a*. That is, the first and second rockers 210*a* and 210*b* are coupled through the linkage, which includes the first strut 218*a*, the link 214, and the second strut 218*b*. As will be appreciated by one of skill in the art, the joints of the linkage may be passive revolute joints, such that the struts 218*a* and 218*b* may rotate relative to the link 214 about their respective common joints and may rotate relative to the corresponding rocker 210*a* and 210*b* (respectively) about their respective common joints.

For example, the first wheel 204*a* may encounter a raised surface (e.g., the beginning of a ramp into a truck, or a piece of debris on a warehouse floor). Upon encountering the raised surface, the first wheel 204*a* may be displaced vertically upwards (e.g., in the positive Z direction in FIG. 3A). This upward displacement of the first wheel 204*a* may cause the first rocker 210*a* to rotate about the first axis 211*a*, which may cause the second wheel 204*b* to be displaced vertically downwards (e.g., in the negative Z direction). Similarly, the upward displacement of the first wheel 204*a* may cause the link 214 to rotate about the third axis 215 (by displacing the first strut 218*a*), which may cause the fourth wheel 204*d* to be displaced vertically downwards (by displacing the second strut 218*b*). This downward displacement of the fourth wheel 204*d* may cause the second rocker 210*b* to rotate about the second axis 211*b*, which may cause the third wheel 204*c* to be displaced vertically upwards.

In alternative embodiments, the linkage may be replaced by one or more other components configured to couple motion of the two rockers. For example, a differential gear set may be used to couple the two rockers. It should be appreciated that any suitable transmission may be used to couple the motion of the two rockers, as the disclosure is not limited in this regard.

In some embodiments, a suspension system of a mobile manipulator robot may be entirely passive (such as the suspension system described above in relation to FIG. 3A), and may not include any actively controlled suspension elements. However, active suspensions are also contemplated, and the disclosure is not limited in this regard. For example, one or more sensors may determine a position of a wheel (e.g., a vertical position), and one or more actuators may be employed to actively control the vertical position of the wheel. An active suspension system may include any suitable number of sensors, springs, dampers, actuators, controllers or any other suitable components, as the disclosure is not so limited. Additionally, it should be appreciated that passive suspension systems that differ from the embodiments of suspension systems described above are also contemplated. For example, a wheel of a mobile manipulator robot may be associated with any suitable number of springs and/or dampers, and any other appropriate components, as the disclosure is not limited in this regard.

FIG. 3B illustrates concepts relating to the stability of the suspension system described above in relation to FIG. 3A. When the mobile base 200 rests on a flat surface, each wheel 204*a*-204*b* forms a contact with the flat surface. The four contacts of the four wheels define a quadrilateral 220. While the quadrilateral 220 is formally defined within the plane of the flat surface on which the mobile base 200 rests, the quadrilateral 220 may, from the perspective of a stability analysis, be projected along an axis perpendicular to the plane (e.g., along a vertical axis aligned with the direction of gravity, such as the Z axis). As such, the quadrilateral 220 shown in FIG. 3B is disposed within a plane defined by the platform 202 of the mobile base 200. It should be appreciated that such a depiction is appropriate when the plane of the top surface of the platform 202 is parallel to the flat surface on which the mobile base 200 rests, and the flat surface is not angled with respect to gravity. Additionally, it should be appreciated that for small angular deviations of the platform 202, the approximation resulting from directly projecting the quadrilateral 220 onto the platform 202 should be associated with mostly insignificant discrepancies.

Due in part to the configuration of the suspension system (including rockers 210*a* and 210*b* and the linkage) described above in relation to FIG. 3A, a support polygon 230 associated with the platform 202 of the mobile base 200 is defined not by the quadrilateral 220, but by a polygon inscribed within the quadrilateral, wherein the vertices of the polygon are disposed on the sides of the quadrilateral. Specifically, the support polygon 230 includes a first vertex 232 on a first side of the quadrilateral 220 (e.g., the side connecting the first and second contacts associated with the first and second wheels 204*a* and 204*b*), a second vertex 234 on a second side of the quadrilateral 220 (e.g., the side connecting the second and third contacts associated with the second and third wheels 204*b* and 204*c*), a third vertex 236 on a third side of the quadrilateral 220 (e.g., the side connecting the third and fourth contacts associated with the third and fourth wheels 204*c* and 204*d*), and a fourth vertex 238 on a fourth side of the quadrilateral 220 (e.g., the side connecting the fourth and first contacts associated with the fourth and first wheels 204*d* and 204*a*). The support polygon 230 defines a region of stability, such that the mobile base 200 will stably support a load on the platform 202 as long as a center of pressure of the load remains within the support polygon 230. Considering the robot 100 of FIGS. 1A and 1B, such a load may include a turntable 120, a robotic arm 130, a perception mast 140, and a payload grasped by the end effector 150 of the robotic arm. In the case of a robotic arm mounted to a turntable, it may be beneficial to additionally consider a circular region 240 that defines a safe operating zone. In the embodiment of FIG. 3B, the circular region 240 is fully inscribed within the support polygon 240 to provide a safety factor (based on the minimum distance from the circular region 240 to the support polygon 230, indicated by arrow 241). However, it should be appreciated that the system could be designed such that the circular region 240 contacts the support polygon 230, as the disclosure is not limited in this regard. In some embodiments, a robot may include a controller configured to maintain the center of pressure of the mobile base, the robotic arm, and the payload within the support polygon as the robotic arm manipulates the payload.

If the center of pressure falls outside of the support polygon 230, the mobile base may respond such that a wheel opposite the load lifts off the ground. For example, if the center of pressure falls outside of the support polygon 230 toward the second wheel 204*b*, the fourth wheel 204*d* may lift off the ground. In such a scenario, a secondary support polygon is defined by the contact points associated with the first, second, and third wheels 204*a*, 204*b*, and 204*c* (in this case, the secondary support polygon is a support triangle). Of course, depending on the location at which the center of pressure leaves the primary support polygon 230, the secondary support polygon may be defined by any three of the four contact points defined by the four wheels 204*a*-204*d*. In some embodiments, a robot may include a controller configured to maintain the center of pressure of the mobile base, the robotic arm, and the payload within the secondary support polygon when the robotic arm manipulates the payload such that the center of pressure falls outside of the primary support polygon.

EXAMPLE TURNTABLE AND PERCEPTION MAST

As described above (e.g., in relation to FIGS. 1A and 1B), a robotic arm of an integrated mobile manipulator robot may be coupled to a mobile base through a turntable. The turntable may rotate the robotic arm relative to the mobile base about a vertical axis (e.g., a yaw axis). In some embodiments, a perception mast may additionally be coupled to the turntable, such that rotation of the turntable rotates (e.g., yaws) the robotic arm as well as the perception mast. In some embodiments, the perception mast may include an additional degree of freedom that allows the perception mast to rotate (e.g., yaw) relative to the turntable. As described above (e.g., in relation to FIG. 2B), such independent control of the perception mast relative to the turntable enables the robot to simultaneously manipulate an object in a first area with the robotic arm (e.g., by using the turntable to reposition the robotic arm as it grasps an object) while the perception mast gathers data about a second area of the environment (e.g., by using the additional actuator of the perception mast to point directional sensors of the perception mast toward the second area). The coordination between the turntable, the perception mast, and other components of the robot is described below.

Figure 4:
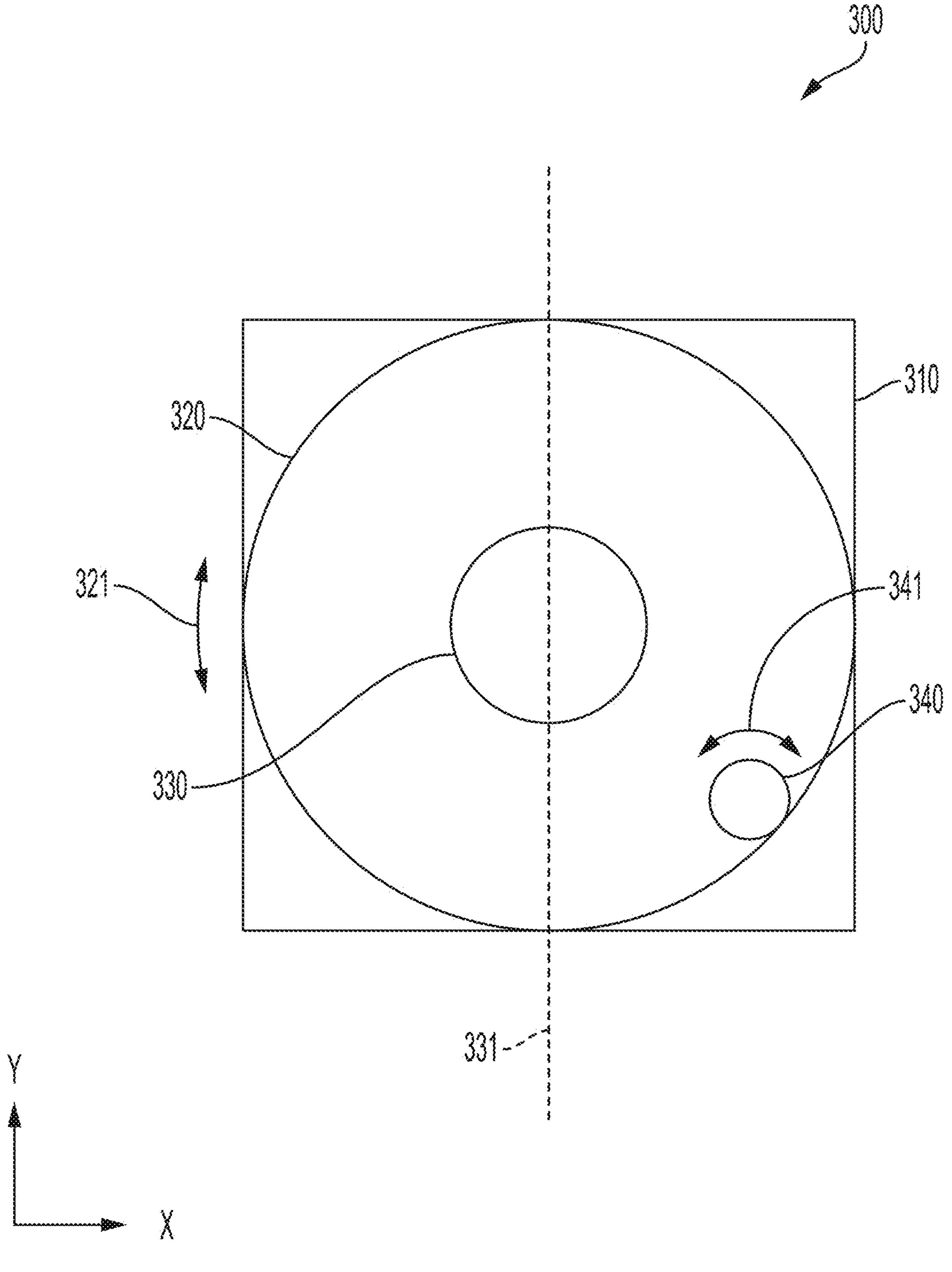
FIG. 4 is a top schematic view of one embodiment of a turntable of a robot.

FIG. 4 is a top schematic view of a robot 300. This abstracted view shows the relationships between motion of the turntable 320, the perception mast 340, and the robotic arm 330. The turntable 320 is configured to rotate relative to the mobile base 310 about a first vertical axis (which, in the top view of FIG. 4, is an axis into the page, which may be parallel to a Z axis that is perpendicular to the X and Y axes depicted in FIG. 4). The rotation of the turntable 320 relative to the mobile base 310 is indicated in the figure by arrow 321. The perception mast 340 is configured to rotate relative to the turntable 320 about a second vertical axis (which, again, in the top view of FIG. 4, is an axis into the page, and which may be parallel to the Z axis). The rotation of the perception mast 340 relative to the turntable 320 is indicated in the figure by arrow 341. It should be appreciated that, with both the first and second axes being vertical, the first and second axes are parallel.

The robotic arm 330 (of which only the footprint on the turntable 320 is shown in FIG. 4 for clarity) is coupled to the turntable 320 such that a base of the robotic arm 330 does not yaw (e.g., does rotate about an axis parallel to the Z axis) relative to the turntable 320. Importantly, the robotic arm 330 is kinematically constrained such that a portion of the robotic arm 330 is constrained to move within a vertical plane 331, defined within a coordinate system of the turntable 320. Briefly turning to FIG. 5, which presents a robotic arm 430 that is largely analogous to the arm 330 of FIG. 4, the portion of the robotic arm 430 proximal to the wrist 438 includes only pitch joints (i.e., joints 432, 434, and 436). That is, the proximal portion of the arm 430 is only able to rotate about parallel horizontal axes (i.e., axes 432*a*, 434*a*, and 436*a* in FIG. 5) relative to the turntable 420. As such, the proximal portion of the arm 430 is only able to move within a vertical plane defined within the coordinate system of the turntable 420. Returning to FIG. 4, a proximal portion of the robotic arm 330 is only able to move within the vertical plane 331. Given that a base of the arm 330 is rigidly mounted to the turntable 320, and therefore rotates about a vertical axis (as indicated by arrow 321) with the turntable 320, the plane 331 in which the proximal portion of the arm 330 moves also rotates with the turntable 320.

Importantly, the perception mast 340 is mounted to the turntable 320 at a location spaced from plane 331, such that the arm 330 is physically unable to collide with the perception mast 340. Stated differently, because both the robotic arm 330 and the perception mast 340 are mounted to the turntable 320, the turntable collocates the arm and the mast, thereby defining their relative positions. Because the perception mast 340 only rotates about a vertical yaw axis, and because the proximal portion of the robotic arm 330 is constrained to operate within a defined vertical plane, neither the robotic arm nor the perception mast is capable of horizontal movement (in the coordinate system of the turntable) to a degree that would result in collision of the arm 330 and the mast 340.

In embodiments of a robotic arm that include a 3-DOF wrist (such as robotic arm 430 of FIG. 5) or that generally include joints other than pitch joints, portions of the robotic arm may not be constrained to remain within a vertical plane as described above. However, certain relevant geometries (e.g., link lengths, end effector sizes, perception mast location) may be selected such that collisions between the robotic arm and the perception mast are nonetheless avoided.

As discussed above, the location of the perception mast on the turntable is based at least in part on the geometry, orientation, and motion of the robotic limb, so as to prevent collisions between the arm and the mast. However, other considerations are also relevant to selection of a location of the perception mast on the turntable. From a sensing perspective, it may be desirable to locate the perception mast at a maximal distance from the robotic arm to limit occlusions of the sensors on the perception mast by the arm. From a safety perspective, it may be desirable to locate the perception mast within a footprint of the mobile base to avoid collisions between the perception mast and the environment. Accordingly, in some embodiments, the perception mast may be located on the turntable at a maximum radial extent of the turntable relative to the axis of rotation of the turntable. For example, if the turntable is circular and the perception mast is circular, the perception mast may be located at a position within the footprint of the turntable such that the circumferences of the perception mast and the turntable are internally tangent.

In addition to a perception mast and/or a robotic arm, other hardware may be mounted to a turntable of a robot. In embodiments of a robot in which an end effector of a robotic arm is a vacuum-based end effector (e.g., a vacuum gripper or suction gripper), the robot may include an on-board vacuum source that is coupled to and supplies vacuum to the end effector. In some such embodiments, the vacuum source may be coupled to a turntable such that the vacuum source rotates with the turntable when the turntable rotates relative to the mobile base. While it may be advantageous (from a stability perspective) to locate a heavy component such as a vacuum source close to the base of the robot, configuring the vacuum source to rotate with the turntable may be associated with certain benefits relating to routing and management of vacuum tubing.

EXAMPLE ROBOTIC ARM

Figure 5:
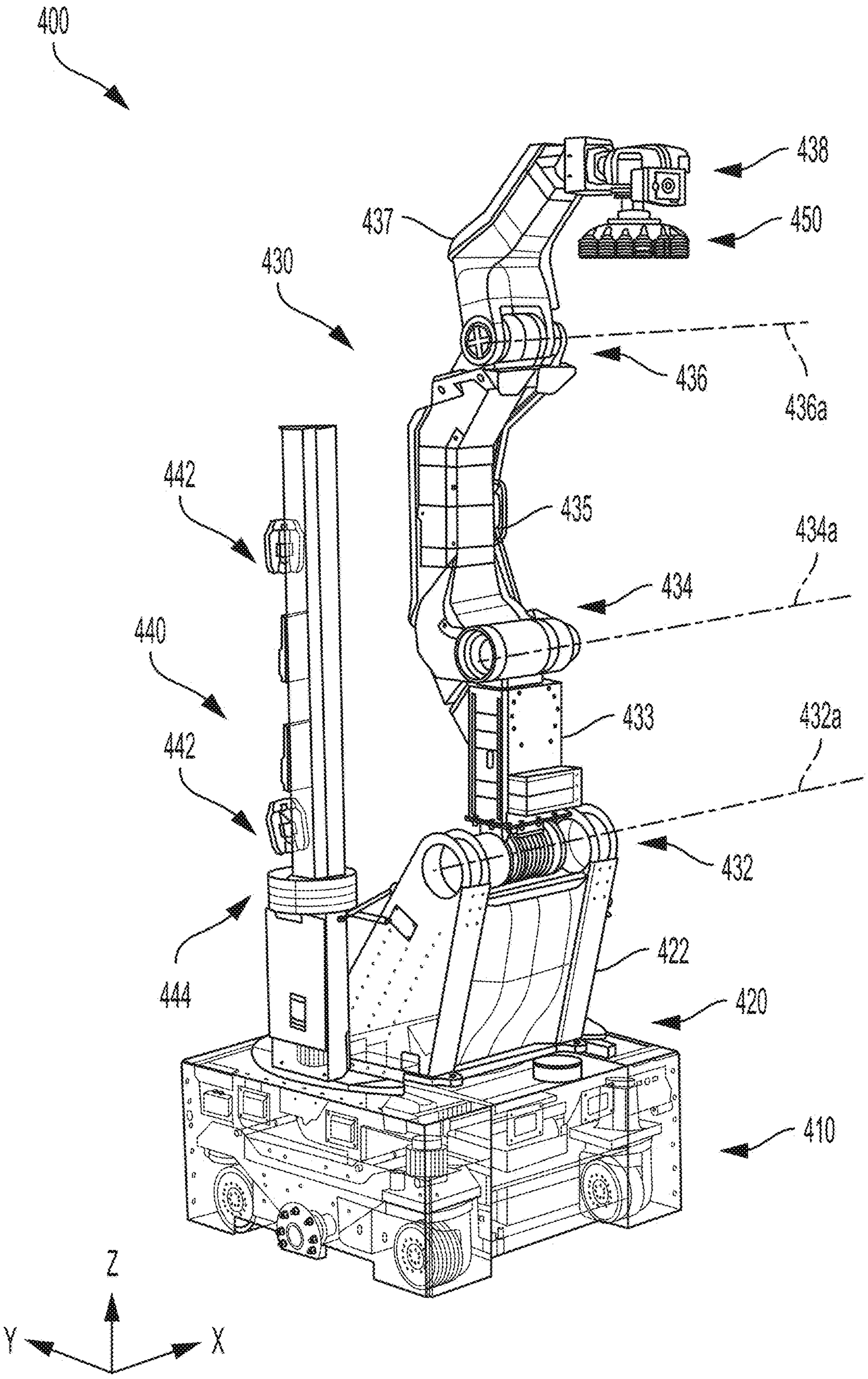
FIG. 5 is a perspective view of one embodiment of a robot.

FIG. 5 is a perspective view of a robot 400 designed in accordance with some embodiments. The robot 400 includes a mobile base 410 and a turntable 420 rotatably coupled to the mobile base. A robotic arm 430 is operatively coupled to the turntable 420, as is a perception mast 440. The perception mast 440 includes an actuator 444 configured to enable rotation of the perception mast 440 relative to the turntable 420 and/or the mobile base 410, so that a direction of the perception modules 442 of the perception mast may be independently controlled.

The robotic arm 430 of FIG. 5 is a 6-DOF robotic arm. When considered in conjunction with the turntable 420 (which is configured to yaw relative to the mobile base about a vertical axis parallel to the Z axis), the arm/turntable system may be considered a 7-DOF system. The 6-DOF robotic arm 430 includes three pitch joints 432, 434, and 436, and a 3-DOF wrist 438 which, in some embodiments, may be a spherical 3-DOF wrist. Starting at the turntable 420, the robotic arm 430 includes a turntable offset 422 which is fixed relative to the turntable 420. A distal portion of the turntable offset 422 is rotatably coupled to a proximal portion of a first link 433 at a first joint 432. A distal portion of the first link 433 is rotatably coupled to a proximal portion of a second link 435 at a second joint 434. A distal portion of the second link 435 is rotatably coupled to a proximal portion of a third link 437 at a third joint 436. The first, second, and third joints 432, 434, and 436 are associated with first, second, and third axes 432*a*, 434*a*, and 436*a*, respectively. The first, second, and third joints 432, 434, and 436 are additionally associated with first, second, and third actuators (not labeled) which are configured to rotate a link about an axis. Generally, the nth actuator is configured to rotate the nth link about the nth axis associated with the nth joint. Specifically, the first actuator is configured to rotate the first link 433 about the first axis 432*a* associated with the first joint 432, the second actuator is configured to rotate the second link 435 about the second axis 434*a* associated with the second joint 434, and the third actuator is configured to rotate the third link 437 about the third axis 436*a* associated with the third joint 436. In the embodiment shown in FIG. 5, the first, second, and third axes 432*a*, 434*a*, and 436*a* are parallel (and, in this case, are all parallel to the X axis). In the embodiment shown in FIG. 5, the first, second, and third joints 432, 434, and 436 are all pitch joints.

In some embodiments, a robotic arm of a highly integrated mobile manipulator robot may include a different number of degrees of freedom than the robotic arms discussed above. Additionally, a robotic arm need not be limited to a robotic arm with three pitch joints and a 3-DOF wrist. It should be appreciated that a robotic arm of a highly integrated mobile manipulator robot may include any suitable number of joints of any suitable type, whether revolute or prismatic. Revolute joints need not be oriented as pitch joints, but rather may be pitch, roll, yaw, or any other suitable type of joint.

It should be appreciated that the links of the robotic arm may be any suitable length, width, shape, or geometry, as the disclosure is not limited in this regard. For example, in the embodiment of FIG. 5, the first link 433 is substantially straight, while the second and third links 435 and 437 are curved or c-shaped. The inventors have recognized and appreciated that curved links (especially toward the distal end of the robotic arm) may be associated with benefits related to object manipulation. For example, when the robotic arm is fully extended in a vertical direction to enable top picking of a high box (as illustrated by the orientation of the robot 400 of FIG. 5), the curved shape of the distal links may accommodate the size and shape of the box. If the distal links (e.g., second and third links 435 and 437) were instead straight, boxes of certain sizes and or geometries may collide with the distal links during a top pick of a high box (or during another manipulation task).

In some embodiments, such as the embodiment of the robot 100 in FIGS. 1A and 1B, the links of the robotic arm may be offset in a horizontal direction. Applying the terminology of FIG. 5 analogously to FIGS. 1A and 1B, the first and second links of the robotic arm 130 of FIGS. 1A and 1B are offset horizontally, compared to the first and second links 433 and 435 of the robotic arm 430 of FIG. 5, which are in-line horizontally. Stated differently, a vertical centerline of the first link of the robotic arm 130 shown in FIG. 1A is not aligned with a vertical centerline of the second link of the robotic arm 130, while a vertical centerline of the first link 433 of the robotic arm 430 shown in FIG. 5 is aligned with a vertical centerline of the second link 435 of the robotic arm 430. The decision to include horizontally in-line or offset links may be based on considerations that include, for example, whether (or how easily) the robot should be able to pull a box into a footprint of the arm (or of the mobile base), strength and/or stability considerations, and the degree to which the arm should be able to retract (e.g., offset links may enable a wider range of joint angles before the robotic arm self-intersects).

Returning to FIG. 5, the robotic arm 430 includes a wrist 438. As noted above, the wrist 438 is a 3-DOF wrist, and in some embodiments may be a spherical 3-DOF wrist. The wrist 438 is coupled to a distal portion of the third link 437. The wrist 438 includes three actuators configured to rotate an end effector 450 coupled to a distal portion of the wrist 438 about three mutually perpendicular axes. Specifically, the wrist may include a first wrist actuator configured to rotate the end effector relative to a distal link of the arm (e.g., the third link 437) about a first wrist axis, a second wrist actuator configured to rotate the end effector relative to the distal link about a second wrist axis, and a third wrist actuator configured to rotate the end effector relative to the distal link about a third wrist axis. The first, second, and third wrist axes may be mutually perpendicular. In embodiments in which the wrist is a spherical wrist, the first, second, and third wrist axes may intersect.

It should be appreciated that, in some embodiments, a wrist actuator may be offset from its respective wrist axis. Specifically, the first wrist actuator may be offset from the first wrist axis, the second wrist actuator may be offset from the second wrist axis, and the third wrist actuator may be offset from the third wrist axis. Offsetting an actuator from an axis of rotation of the associated link(s) may leave a space through which wires and/or vacuum tubing may be routed, as explained in greater detail below. It should be appreciated that other actuators of the robotic arm may also include offset actuators.

In some embodiments, connections to the end effector (e.g., wires, vacuum tubing) are routed through the wrist. For example, in embodiments of the wrist in which the three actuators are offset from their respective axes, wires and/or tubing connecting the end effector to other portions of the robot may be routed through a space within the wrist that includes the intersection point of the three rotation axes of the wrist (in the example of a spherical wrist). In some embodiments of a robotic arm with a vacuum-based end effector, vacuum tubing coupled to an end effector is routed through the intersection point of the three rotation axes of the spherical wrist. In some embodiments, the wrist (and/or any other joint of the robotic arm) may include one or more slip rings, such as vacuum slip rings configured to couple a vacuum-based end effector to a vacuum source. In some embodiments, connections to the end effector may be routed externally to a proximal portion of the robotic arm, and may be routed internally to a distal portion of the robotic arm. External routing may be more cost effective and generally a simpler solution when internal routing is unneeded. Internal routing may be preferable to protect connections on portions of the arm that are more likely to contact the environment, such as distal portions of the arm (especially during a keyhole maneuver, as described above in relation to FIG. 2C).

In the embodiment of FIG. 5, the end effector 450 is a vacuum-based end effector. As described above, an associated vacuum source may be coupled to a turntable, and vacuum tubing from the vacuum source to the end effector may be routed along and/or through the arm (e.g., externally along a proximal portion of the arm, internally through a distal portion of the arm, through a wrist of the robotic arm). In some embodiments, a vacuum source may be disposed within the end effector, obviating the need to route vacuum tubing along portions of the arm.

In embodiments in which the end effector is a vacuum-based end effector, the end effector may include multiple vacuum assemblies that attach to an object by applying a suction force through a suction cup. The vacuum assemblies may be individually addressable, such that a controller may adjust a level of suction of each vacuum assembly independently. For example, each vacuum assembly may include a sensor (such as a pressure sensor) to determine a grip quality between the vacuum assembly and the object being grasped. If it is determined that some vacuum assemblies are insufficiently attached to the object (e.g., due to a poor suction cup seal), those vacuum assemblies may be turned off such that the total vacuum pressure of the end effector may be distributed among only the vacuum assemblies with a good seal, reducing the amount of vacuum pressure that is wasted.

Figure 6B:
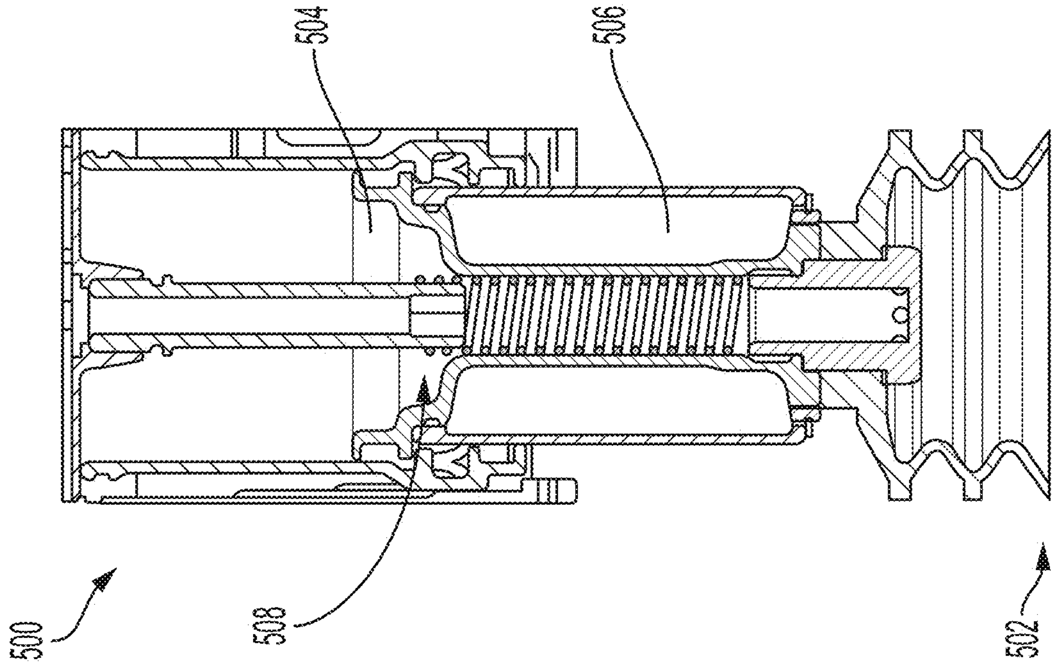
FIG. 6B is a cross-sectional front view of the vacuum assembly of FIG. 6A in an extended configuration.
Figure 6A:
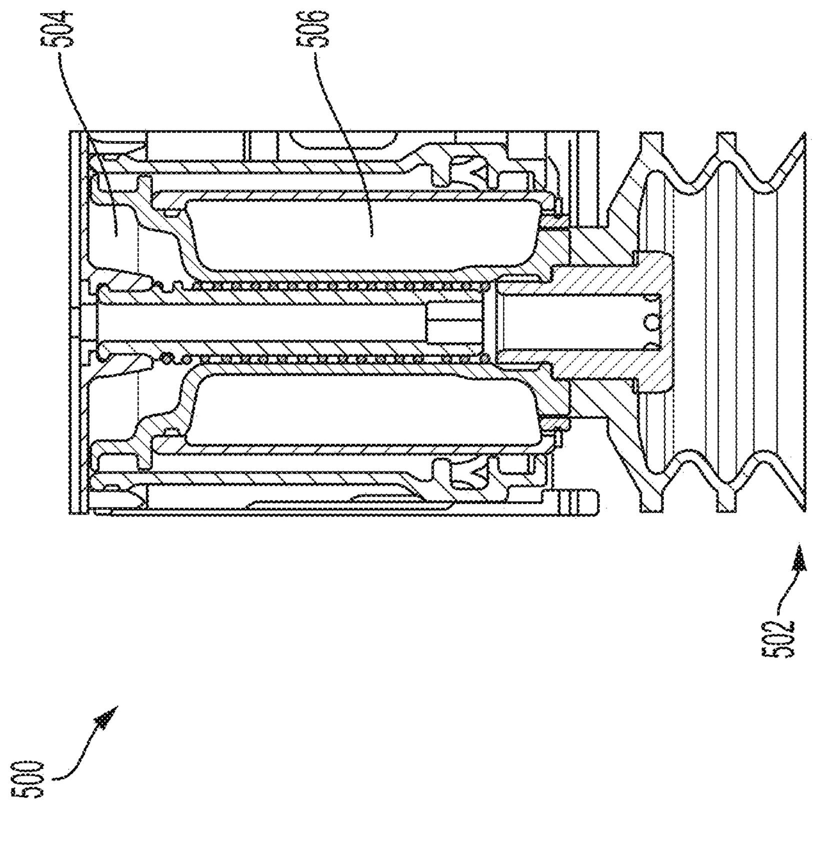
FIG. 6A is a cross-sectional front view of one embodiment of a vacuum assembly in a retracted configuration.

In some embodiments, each vacuum assembly may be associated with a prismatic degree of freedom, which may enable the end effector to engage effectively with a non-flat surface of an object to be picked. FIGS. 6A and 6B are cross-sectional views of one embodiment of a vacuum assembly 500 in retracted and extended configurations, respectively. In the retracted configuration of FIG. 6A, a suction cup 502 of the vacuum assembly 500 is proximal to the remainder of the vacuum assembly. When pressure is applied to a piston head 504 of a prismatic stage of the vacuum assembly, a piston rod 506 extends, thereby extending the suction cup 502, which is coupled to a distal portion of the piston rod 506. When pressure is removed, a spring 508 retracts the suction cup 502 so that the vacuum assembly returns to its retracted state. A prismatic stage of a vacuum assembly may be sufficiently stiff in shear (e.g., in directions perpendicular to the extension direction of the prismatic stage), which may be particularly advantageous during face picks.

In some embodiments, an end effector may include one or more assistive components that facilitate grasping an object securely. For example, an end effector may include strips or coatings of a high-friction material (e.g., a rubber material) to increase friction between the end effector and the object being manipulated, which may be particularly advantageous during a face pick. Alternatively or additionally, an end effector may include a protruding edge or lip on one side of the end effector, which may be positioned below a bottom edge of a box to partially support the weight of the box.

In some embodiments, an end effector may be associated with one or more sensors. For example, a force/torque sensor may measure wrenches applied to the end effector (or applied to a wrist of the robotic arm by the end effector) as an object is manipulated, which may be used during path planning operations. An end effector (or another portion of the robotic arm) may additionally include any appropriate number or configuration of cameras, distance sensors, pressure sensors, light sensors, or any other suitable sensors, as the disclosure is not limited in this regard.

EXAMPLE CONTROL STRATEGIES

With the various subsystems of an integrated mobile manipulator robot having been described, reference is again made to the example applications illustrated in FIGS. 2A-2C to highlight various control strategies enabled by such system-level design and integration.

As robots move about a warehouse, such as robots 10*a*-10*c* in FIG. 2A, safety is a central concern. A loosely integrated mobile manipulator robot may include separate power supplies, separate controllers, and separate safety systems. In contrast, a highly integrated mobile manipulator robot, such as the embodiments of robots described herein, may include a single power supply shared across the mobile base and the robotic arm, a central controller overseeing operation of both the mobile base and the robotic arm, and/or holistic safety systems configured to monitor and, when appropriate, shut down the entire robot. For example, a safety system that is aware of the current state of both the arm and the base may appropriately define safe operating limits for the arm and the base that account for the motion of the other subsystem. In contrast, if a safety system associated with only the mobile base is unaware of the state of the robotic arm, the safety system of the mobile base must conservatively limit its operation to account for uncertainty about whether the robotic arm is operating in a potentially dangerous state. Similarly, if a safety system associated with only the robotic arm is unaware of the state of the mobile base, the safety system of the robotic arm must conservatively limit its operation to account for uncertainty about whether the mobile base is operating in a potentially dangerous state. A holistic safety system associated with a highly integrated mobile manipulator robot may be associated the comparatively less restrictive limits, enabling faster, more dynamic, and/or more efficient motions.

For certain tasks, it may be beneficial to limit motion of either the robotic arm or the mobile base, even for an integrated mobile manipulation robot. For example, while navigating a warehouse floor, it may be advantageous to minimize or entirely restrict motion of the robotic arm (e.g., due to safety considerations). Alternatively, while unloading boxes from a truck onto a conveyor belt, it may be advantageous for the mobile base to remain stationary as the robotic arm operates.

As discussed previously in reference to FIG. 2B, the turntable, robotic arm, and perception mast of a robot (e.g., robot 20*a*) may all be controlled in a highly coordinated fashion. Briefly summarizing the above discussion, the turntable may rotate to enable the robotic arm to move a box from the truck 29 onto the conveyor belt 22 while the perception mast is oriented away from the robotic arm to gather information about the environment in preparation for the next task. Throughout this process, it may be preferable for the mobile base to remain stationary. From a sensing perspective, sensors associated with the robotic arm (e.g., joint encoders) may operate at a higher frequency and with lower latency compared to sensors associated with the mobile base (e.g., LiDAR sensors); accordingly, moving only the robotic arm (and turntable) while keeping the mobile base stationary may enable faster and/or more efficient execution of tasks. From a physical perspective, a robot operating inside of a truck may be constrained spatially by the walls of the truck such that coordinated motion of the arm and the base may be unhelpful or simply impractical.

Regardless, portions of the mobile base may contribute to the successful and efficient execution of a task (such as the truck unloading task depicted in FIG. 2B) even if the mobile base is stationary. For example, a robot with a drive system that includes independently drivable wheels may be associated with sufficient traction and stiffness to enable dynamic arm motions that might be unavailable to a different robot with the same robotic arm but a drive system without independently drivable wheels. Similarly, independently steerable wheels may enable an omnidirectional base that allows the robot to position itself to be able to perform certain arm motions that may be unavailable to a different robot that is unable to, for example, drive arbitrarily close to a stack of boxes. As another example, a mobile base with a suspension system specifically designed to accommodate highly dynamic arm motions may be preferable compared to an off-the-shelf mobile base with a suspension system that was never intended to support a robotic arm and its associated inertial movements.

For certain tasks, it may be beneficial to encourage simultaneous motion of both the robotic arm and the mobile base. As discussed previously in reference to FIG. 2C, a mobile manipulator robot (e.g., robot 30*a*) may encounter a keyhole problem in which the robotic arm is to navigate a confined space to access a target box, while ensuring that the arm does not contact any other object in the environment. In such scenarios, simultaneous and coordinated control of both the arm and the base may be beneficial. For instance, the position and/or orientation of the mobile base may be continuously adjusted as the robotic arm navigates the confined space, so that the reachable workspace (and/or the dexterous workspace) of the end effector may be continuously (and advantageously) adjusted.

Control of one or more of the robotic arm, the mobile base, the turntable, and the perception mast may be accomplished using one or more computing devices located on-board the mobile manipulator robot. For instance, one or more computing devices may be located within a portion of the mobile base with connections extending between the one or more computing devices and components of the robot that provide sensing capabilities and components of the robot to be controlled. In some embodiments, the one or more computing devices may be coupled to dedicated hardware configured to send control signals to particular components of the robot to effectuate operation of the various robot systems. In some embodiments, the mobile manipulator robot may include a dedicated safety-rated computing device configured to integrate with safety systems that ensure safe operation of the robot.

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the terms "physical processor" or "computer processor" generally refer to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of a robot may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the robot and/or driving a wheel or arm of the robot. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

The invention claimed is:

1. A robot comprising:

a mobile base;

a turntable rotatably coupled to the mobile base;

a robotic arm operatively coupled to the turntable;

a vacuum-based gripper rotatably coupled to the robotic arm, the vacuum-based gripper including a plurality of individually controllable suction cup assemblies; and a perception system comprising a perception mast rotatably coupled to the turntable, the perception mast including a first perception module and a second perception module.

2. The robot of claim 1, wherein the turntable is configured to rotate relative to the mobile base about a first axis, wherein the perception mast is configured to rotate relative to the turntable about a second axis, and wherein the first axis and the second axis are parallel.

3. The robot of claim 2, wherein the robotic arm is kinematically constrained to avoid collisions with the perception mast.

4. The robot of claim 1, wherein the mobile base comprises a holonomic drive system.

5. The robot of claim 1, further comprising:

at least one controller, wherein the at least one controller is configured to coordinate operation of the turntable, the robotic arm, the vacuum-based gripper, the first perception module, and the second perception module to perform an action.

6. The robot of claim 5, wherein the action comprises grasping one or more boxes and placing the one or more boxes, once grasped, on a conveyor.

7. The robot of claim 1, wherein the mobile base comprises a set of wheels, and the robot further comprises:

an omnidirectional drive system configured to drive the set of wheels of the mobile base.

8. The robot of claim 7, wherein each wheel of the set of wheels is independently steerable and/or drivable.

9. The robot of claim 7, wherein the mobile base further comprises:

a platform to which the turntable is rotatably coupled; and a suspension system configured to control distances between the platform and each wheel of the set of wheels.

10. The robot of claim 1, wherein the robotic arm is a six degree of freedom robotic arm.

11. The robot of claim 10, wherein the robotic arm comprises three pitch joints and a wrist, wherein the wrist is a spherical wrist.

12. The robot of claim 10, wherein the robotic arm comprises:

a first joint comprising a first actuator configured to rotate a first link of the robotic arm relative to the turntable about a first axis;

a second joint comprising a second actuator configured to rotate a second link of the robotic arm relative to the first link about a second axis; and a third joint comprising a third actuator configured to rotate a third link of the robotic arm relative to the second link about a third axis;

wherein the first axis, the second axis, and the third axis are parallel.

13. The robot of claim 10, wherein the robotic arm comprises:

a link;

an end effector; and a spherical wrist coupling the link and the end effector, the spherical wrist comprising:

a first actuator configured to rotate the end effector relative to the link about a first axis;

a second actuator configured to rotate the end effector relative to the link about a second axis; and a third actuator configured to rotate the end effector relative to the link about a third axis, wherein the first axis, the second axis, and the third axis are mutually perpendicular, and wherein the first axis, the second axis, and the third axis intersect.

14. The robot of claim 1, wherein the mobile base comprises a plurality of distance sensors.

15. The robot of claim 14, wherein the plurality of distance sensors comprise a plurality of LiDAR sensors.

16. The robot of claim 14, wherein the mobile base is rectangular, and wherein each side of the mobile base is associated with at least one of the plurality of distance sensors.

17. The robot of claim 16, wherein the mobile base is square.

* * * * *